(12) United States Patent
Ritchie et al.

(10) Patent No.: US 10,907,410 B2
(45) Date of Patent: Feb. 2, 2021

(54) COMPOUND ANGLE BEARING ASSEMBLY

(71) Applicant: TURBO DRILL INDUSTRIES, INC., Conroe, TX (US)

(72) Inventors: Sheldon Ritchie, Conroe, TX (US); Chad Feddema, Conroe, TX (US)

(73) Assignee: TURBO DRILL INDUSTRIES, INC., Conroe, TX (US)

( * ) Notice: Subject to any disclaimer, the term of this patent is extended or adjusted under 35 U.S.C. 154(b) by 0 days.

(21) Appl. No.: 16/822,667

(22) Filed: Mar. 18, 2020

(65) Prior Publication Data

US 2020/0217138 A1 Jul. 9, 2020

Related U.S. Application Data

(62) Division of application No. 15/789,988, filed on Oct. 21, 2017, now Pat. No. 10,633,919.

(Continued)

(51) Int. Cl.
| | |
|---|---|
| *E21B 4/00* | (2006.01) |
| *E21B 7/06* | (2006.01) |
| *E21B 17/10* | (2006.01) |
| *F16C 35/02* | (2006.01) |
| *F16C 35/04* | (2006.01) |
| *E21B 34/12* | (2006.01) |

(Continued)

(52) U.S. Cl.
CPC .............. *E21B 4/003* (2013.01); *E21B 7/062* (2013.01); *E21B 7/067* (2013.01); *E21B 17/1014* (2013.01); *E21B 34/12* (2013.01); *F16C 25/08* (2013.01); *F16C 35/02* (2013.01); *F16C 35/042* (2013.01); *F16C 17/02* (2013.01); *F16C 17/04* (2013.01); *F16C 19/54* (2013.01); *F16C 33/26* (2013.01); *F16C 2240/30* (2013.01); *F16C 2352/00* (2013.01)

(58) Field of Classification Search
None
See application file for complete search history.

(56) References Cited

U.S. PATENT DOCUMENTS

| | | | | |
|---|---|---|---|---|
| 8,919,458 | B2 * | 12/2014 | Plop ....................... | E21B 7/062 175/61 |
| 2011/0120775 | A1 * | 5/2011 | Krueger .................. | E21B 7/068 175/73 |

(Continued)

FOREIGN PATENT DOCUMENTS

CA 2715867 A1 3/2012

OTHER PUBLICATIONS

Supplementary European Search Report issued in 17862096.9, dated Jun. 4, 2020, 17 pages.

*Primary Examiner* — Shane Bomar
(74) *Attorney, Agent, or Firm* — Adolph Locklar

(57) ABSTRACT

A bearing housing for a bottomhole assembly of a downhole tool includes an upper bearing housing, lower bearing housing, and a driveshaft. The upper bearing housing and lower bearing housing include a bore defining a bore longitudinal axis. The outer surface of the upper bearing housing defining a bearing housing longitudinal axis, the bearing housing longitudinal axis formed at an angle to the bore longitudinal axis. The upper bearing housing may be formed by forming a bore through an upper bearing housing blank and subsequently forming the outer surface of the upper bearing housing concentric with the bearing housing longitudinal axis.

26 Claims, 23 Drawing Sheets

Related U.S. Application Data

(60) Provisional application No. 62/411,421, filed on Oct. 21, 2016.

(51) Int. Cl.
    *F16C 25/08*     (2006.01)
    *F16C 17/02*     (2006.01)
    *F16C 33/26*     (2006.01)
    *F16C 17/04*     (2006.01)
    *F16C 19/54*     (2006.01)

(56) References Cited

U.S. PATENT DOCUMENTS

| | | |
|---|---|---|
| 2012/0037428 A1 | 2/2012 | Plop |
| 2014/0251695 A1* | 9/2014 | Marchand ............... E21B 7/068 175/74 |
| 2016/0258218 A1* | 9/2016 | Lange ..................... E21B 17/20 |
| 2017/0002610 A1* | 1/2017 | Marshall .................. E21B 7/04 |
| 2019/0301245 A1* | 10/2019 | Lasater ............... E21B 17/1078 |
| 2019/0330925 A1* | 10/2019 | Marchand ............... E21B 4/003 |
| 2020/0063496 A1* | 2/2020 | Liu ............................ E21B 7/06 |

\* cited by examiner

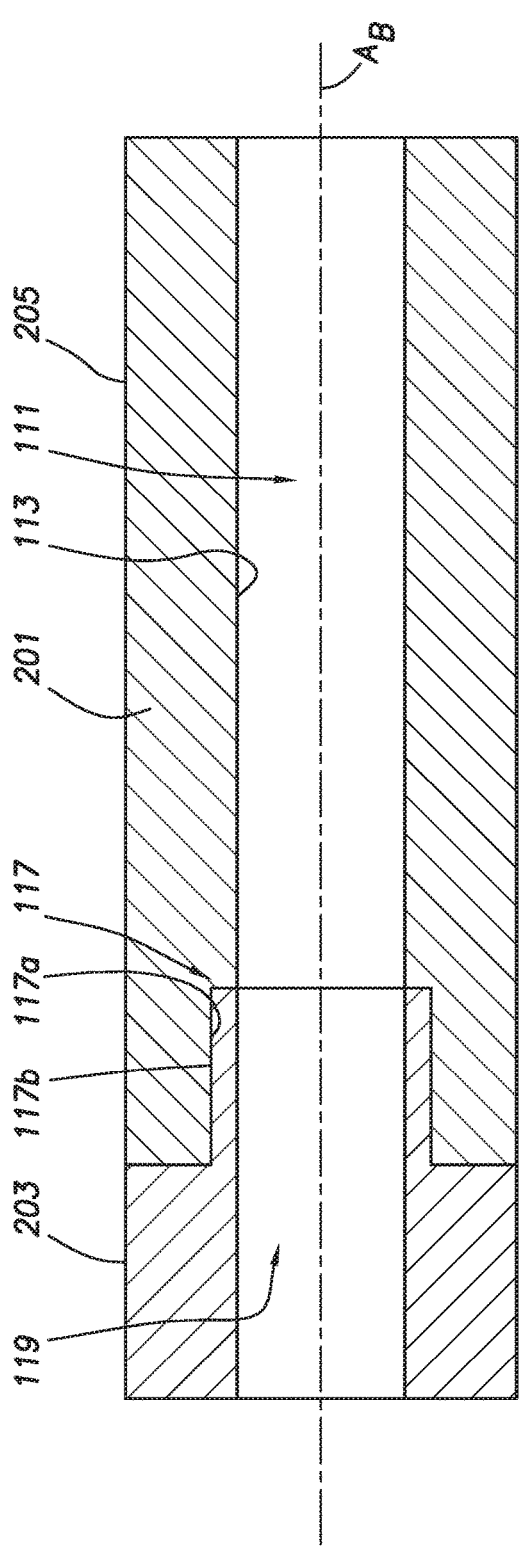
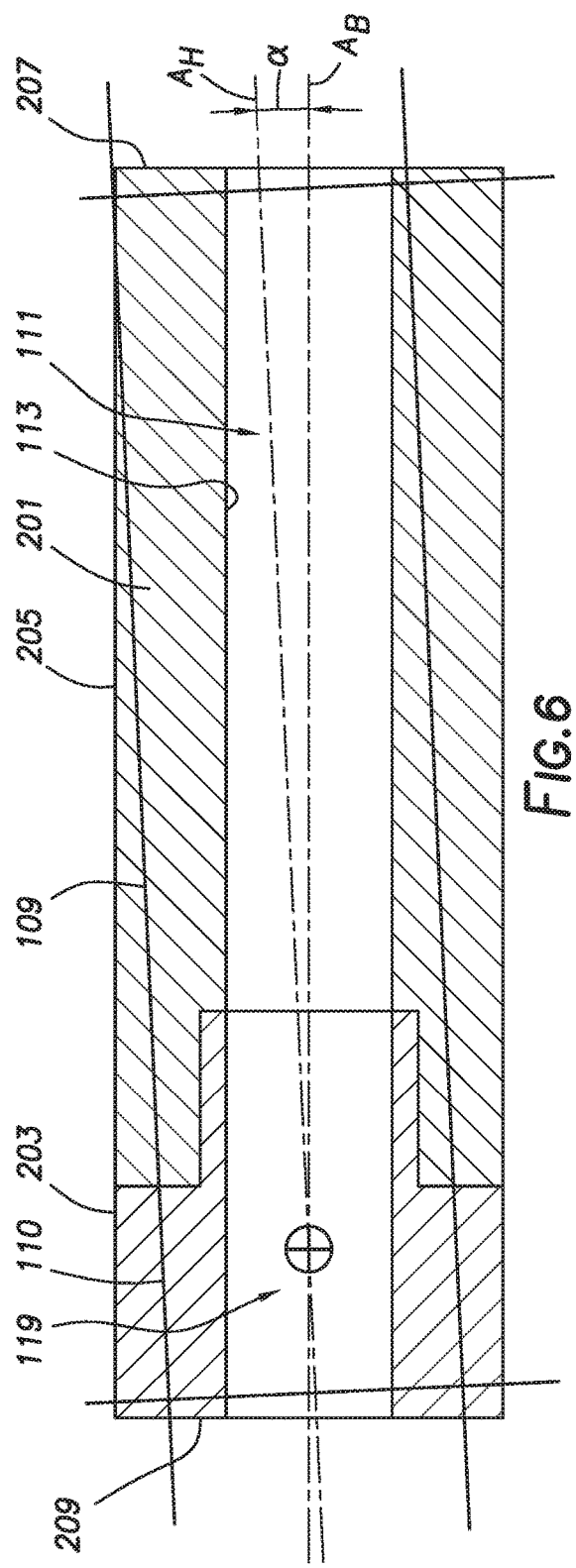

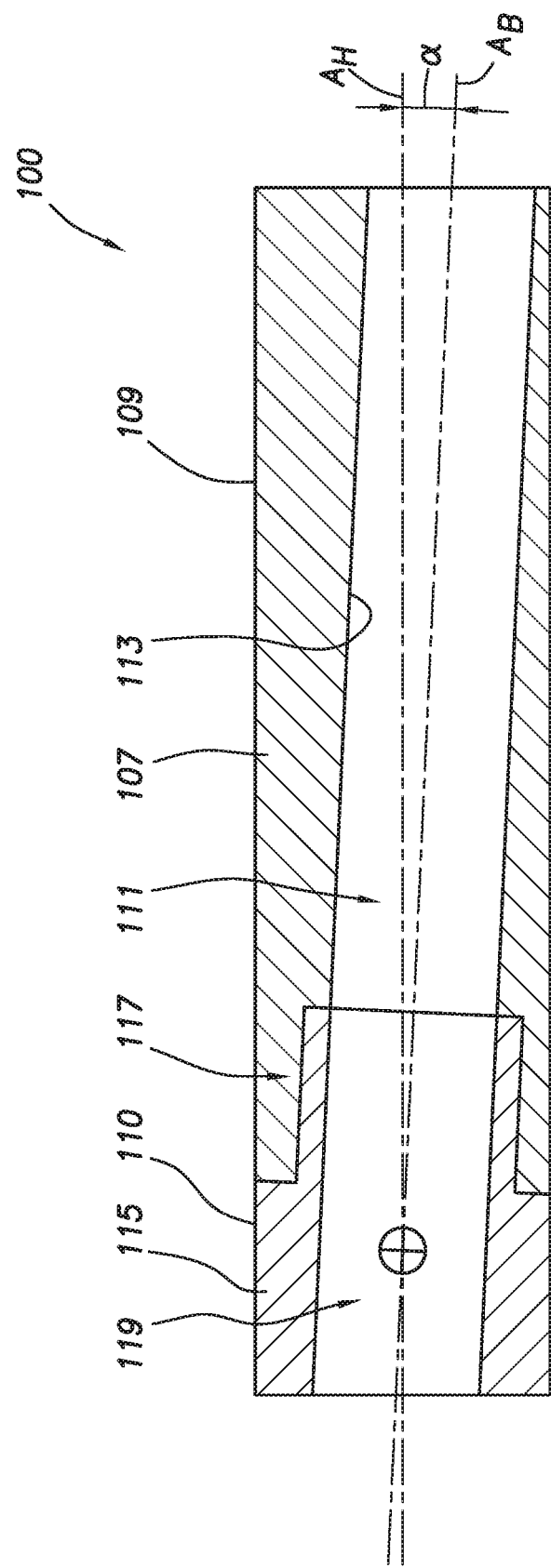

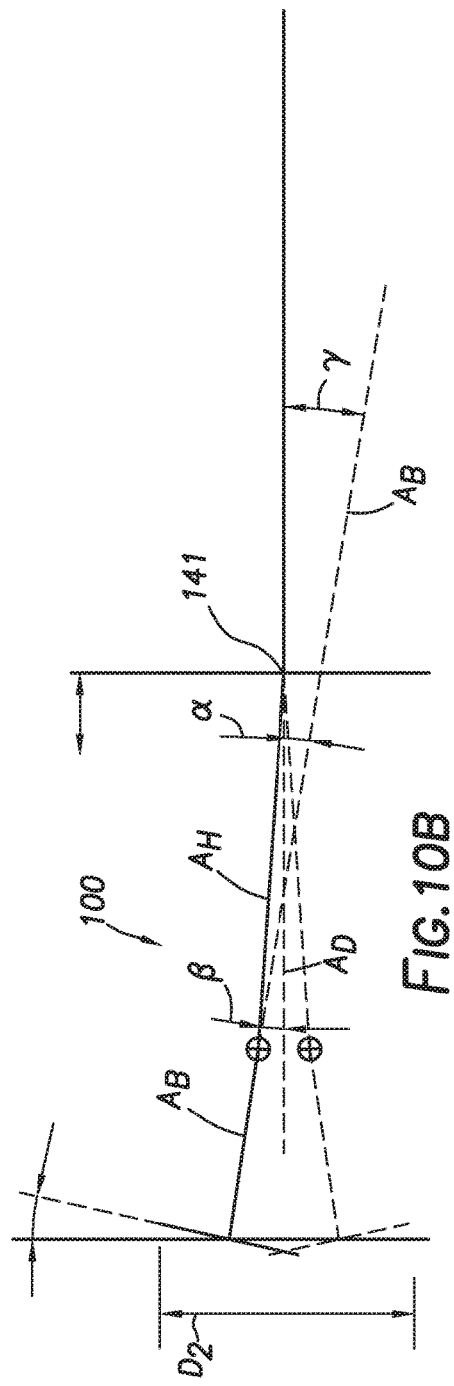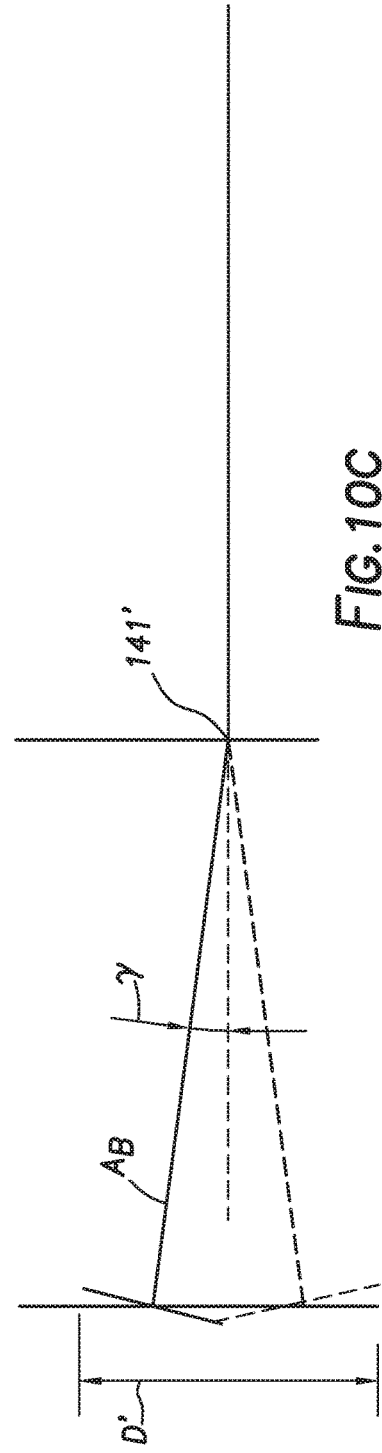

COMPOUND ANGLE BEARING ASSEMBLY

CROSS-REFERENCE TO RELATED APPLICATIONS

This application is a divisional application that claims priority from U.S. non-provisional application Ser. No. 15/789,988, filed Oct. 21, 2017 that claims priority from U.S. provisional application No. 62/411,421, filed Oct. 21, 2016, both of which are incorporated herein by reference.

TECHNICAL FIELD

Field of the Disclosure

The present disclosure relates generally to bearing assemblies, and specifically to bearing assemblies for directional drilling.

Background of the Disclosure

When drilling a wellbore, the drill bit may be turned by a rotation of the drill string or by a downhole motor. The downhole motor may be used to rotate the drill bit while the drill string is stationary. In such a drill string, the bottom hole assembly (BHA), located at the end of the drill string, may include the downhole motor, the drill bit, and a bearing section. The bearing section couples between the motor sub and the drill bit and houses the drive shaft which couples between the drill bit and the downhole motor. The bearing section couples to the drive shaft through one or more bearings to allow rotation of the drive shaft as the bearing section remains generally stationary within the wellbore.

During a directional drilling operation, a bent sub having an adjustable or fixed bend is typically included in the BHA between the downhole motor and the bearing section. The bent sub introduces an angle in the progression of the wellbore by angling the bearing section and therefore the drill bit relative to the downhole motor. However, the introduced external angle may, for example and without limitation, limit the ability to operate the drill string in rotary mode because of the increased bit orbit diameter, increased friction, and increased vibration or shock on the drill string.

SUMMARY

The present disclosure provides for a method for forming a bearing assembly. The method may include providing an upper housing blank. The upper housing blank may have a generally cylindrical outer surface. The longitudinal axis of the upper housing blank may define a bore longitudinal axis. The method may include forming a bore through the upper housing blank. The bore may define an upper bearing housing bore. The upper bearing housing bore may be formed concentrically with the bore longitudinal axis. The method may include machining the outer surface of the upper housing blank to form an upper bearing housing outer surface. The upper bearing housing outer surface may be generally cylindrical. The longitudinal axis of the upper bearing housing outer surface may define a bearing housing longitudinal axis. The bearing housing longitudinal axis may intersect the bore longitudinal axis at an angle. The method may include positioning a driveshaft within the upper bearing housing bore.

The present disclosure also provides for a bearing assembly for a downhole tool. The bearing assembly may include an upper bearing housing. The upper bearing housing may include an upper bearing housing outer surface. The upper bearing housing outer surface may be generally cylindrical along a bearing housing longitudinal axis. The upper bearing housing may include an upper bearing housing bore formed therein defining an upper bearing housing inner surface. The upper bearing housing bore may be generally cylindrical and may be formed along a bore longitudinal axis. The bore longitudinal axis may be formed at an angle to the bearing housing longitudinal axis. The bearing assembly may include a lower bearing housing. The lower bearing housing may be mechanically coupled to the upper bearing housing. The lower bearing housing may include a lower bearing housing bore formed along the bore longitudinal axis defining a lower bearing housing inner surface. The bearing assembly may include a driveshaft positioned within and concentric with the upper bearing housing bore and the lower bearing housing bore such that it extends along the bore longitudinal axis.

The present disclosure also provides for a bottomhole assembly. The bottomhole assembly may include a bearing assembly. The bearing assembly may include an upper bearing housing. The upper bearing housing may include an upper bearing housing outer surface. The upper bearing housing outer surface may be generally cylindrical along a bearing housing longitudinal axis. The upper bearing housing may include an upper bearing housing bore formed therein defining an upper bearing housing inner surface. The upper bearing housing bore may be generally cylindrical and may be formed along a bore longitudinal axis. The bore longitudinal axis may be formed at an angle to the bearing housing longitudinal axis. The bearing assembly may include a lower bearing housing. The lower bearing housing may be mechanically coupled to the upper bearing housing. The lower bearing housing may include a lower bearing housing bore formed along the bore longitudinal axis defining a lower bearing housing inner surface. The bearing assembly may include a driveshaft positioned within and concentric with the upper bearing housing bore and the lower bearing housing bore such that it extends along the bore longitudinal axis. The bottomhole assembly may include a transmission housing mechanically coupled to the upper bearing housing. The bottomhole assembly may include a transmission shaft positioned within the transmission housing, the transmission shaft mechanically coupled to the driveshaft.

The present disclosure also provides for a method. The method may include providing a bearing assembly. The bearing assembly may include an upper bearing housing having an upper bearing housing outer surface. The upper bearing assembly may include a control piston positioned within a control piston cylinder. The control piston cylinder may be formed in the outer surface of the upper bearing housing. The upper bearing assembly may include a control port formed in the upper bearing housing. The control port may be in fluid communication with the control piston cylinder. The upper bearing assembly may include a control valve assembly positioned at the upper end of the upper bearing housing. The control valve assembly may include a fluid supply port formed in the upper bearing housing in fluid communication with the interior of the upper bearing housing. The control valve assembly may include a valve actuator pivotably coupled to the upper end of the upper bearing housing by a pivot pin. The pivot pin may be tubular. The valve actuator may include a valve port formed therein in fluid communication with the fluid supply port through the pivot pin. The control valve assembly may include an output port formed in the upper bearing housing in fluid communication with the control port. The output port may be in fluid communication with the valve port when the valve actuator is in an open position and out of fluid communication with the valve port when the valve actuator is in a closed position. The method may include positioning the valve actuator in the open position such that the valve port and output port are in fluid communication. The method may include providing fluid pressure from the interior of the upper bearing housing to the control piston cylinder through the fluid supply port, valve port, output port, and control port. The method may include extending the control piston. The method may include rotating the bearing assembly. The method may include pivoting the valve actuator from the open position to the closed position by rotational forces acting on the valve actuator. The method may include preventing fluid communication between the valve port and output port by the valve actuator. The method may include retracting the control piston.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 3-7 depict steps of a method for forming a bearing assembly consistent with at least one embodiment of the present disclosure.

FIG. 10A depicts a schematic view of a BHA consistent with at least one embodiment of the present disclosure.

FIG. 10B depicts a schematic view of a BHA consistent with at least one embodiment of the present disclosure.

FIG. 10C depicts a schematic view of a BHA having a bent sub.

DETAILED DESCRIPTION

Figure 1:
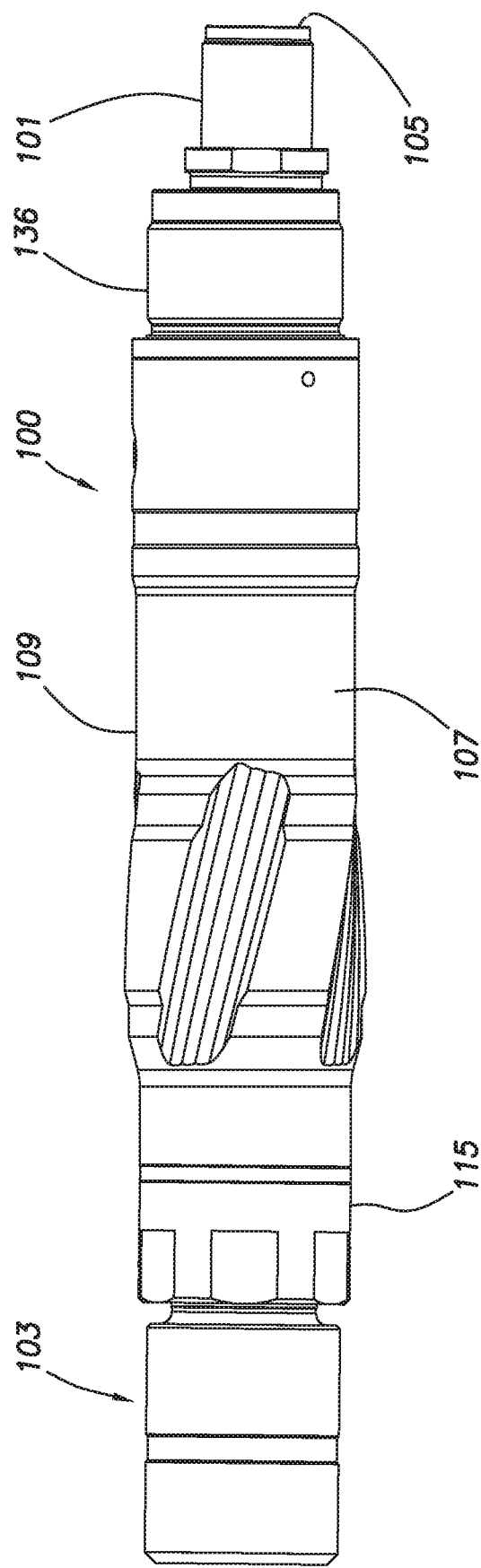
FIG. 1 is an elevation view of a bearing assembly consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
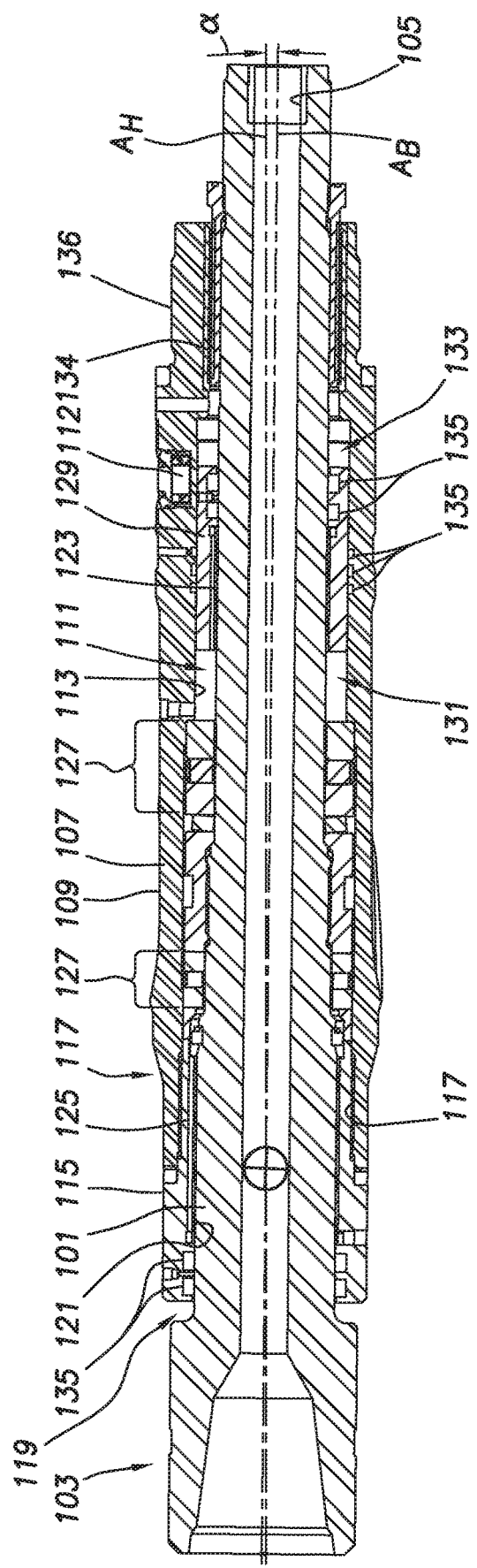
FIG. 2 is a cross section view of the bearing assembly of FIG. 1.

FIGS. 1, 2 depict bearing assembly 100 consistent with at least one embodiment of the present disclosure. Bearing assembly 100 may be used to couple driveshaft 101 to a power section of a drilling string for use in a wellbore. In some embodiments, driveshaft 101 may include bit box 103 positioned at a lower end of driveshaft 101. As used herein, the terms "upper" and "lower" refer to relative directions while bearing assembly 100 is positioned within a wellbore towards the surface and away from the surface respectively. Bit box 103 may, for example and without limitation, be used to couple a drilling bit to driveshaft 101. In some embodiments, driveshaft 101 may include coupler 105 for coupling driveshaft 101 to a shaft such as a transmission shaft of a power section such as an electric motor, turbine, or positive displacement mud motor.

In some embodiments, bearing assembly 100 may include upper bearing housing 107. Upper bearing housing 107 may include upper bearing housing outer surface 109. Upper bearing housing outer surface 109 may be generally cylindrical. The cylindrical surface of upper bearing housing outer surface 109 may define bearing housing longitudinal axis $A_H$. Upper bearing housing 107 may include upper bearing housing bore 111 formed therethrough defining upper bearing housing inner surface 113. In some embodiments, upper bearing housing inner surface 113 may be generally cylindrical. The cylindrical surface of upper bearing housing inner surface 113 may define bore longitudinal axis $A_B$. In some embodiments, bearing housing longitudinal axis $A_H$ and bore longitudinal axis $A_B$ may intersect at a point denoted bend point ⊕. In some embodiments, upper bearing housing bore 111 may be formed such that bore longitudinal axis $A_B$ is at an angle to bearing housing longitudinal axis $A_H$, denoted angle α in FIG. 2.

In some embodiments, bearing assembly 100 may include lower bearing housing 115. Lower bearing housing 115 may be mechanically coupled to upper bearing housing 107. In some embodiments, lower bearing housing 115 may be mechanically coupled to upper bearing housing 107 by a repeatable connection such as a threaded coupling depicted in FIG. 2 as threaded interface 117, which may form a fluid seal as discussed herein below. Lower bearing housing 115 may include lower bearing housing bore 119 formed therethrough defining lower bearing housing inner surface 121. Lower bearing housing bore 119 and upper bearing housing bore 111 may be connected and substantially concentric along bore longitudinal axis $A_B$.

In some embodiments, driveshaft 101 may be positioned within upper bearing housing bore 111 and lower bearing housing bore 119. Driveshaft 101 may be tubular and may extend substantially along bore longitudinal axis $A_B$. Driveshaft 101 may be rotatable within upper bearing housing 107 and lower bearing housing 115. In some embodiments, driveshaft 101 may be rotated relative to bearing assembly 100 while the drill string is stationary, defining a sliding mode of operation.

In some embodiments, one or more bearings may be positioned between driveshaft 101 and one or both of upper bearing housing 107 and lower bearing housing 115. For example, in some embodiments, one or more radial bearings such as upper radial bearing 123 may be positioned between driveshaft 101 and upper bearing housing inner surface 113 and lower radial bearing 125 may be positioned between driveshaft 101 and lower bearing housing inner surface 121. Upper radial bearing 123 and lower radial bearing 125 may, for example and without limitation, reduce friction between driveshaft 101 and upper and lower bearing housings 107, 115 while driveshaft 101 is rotated. Upper radial bearings 123 and lower radial bearings 125 may resist lateral force between driveshaft 101 and upper and lower bearing housings 107, 115 during a drilling operation. Because driveshaft 101 is at angle α to the direction weight is applied to the drill bit, radial and lateral forces may be applied against upper radial bearings 123 and lower radial bearings 125. In some embodiments, by forming upper radial bearings 123 and lower radial bearings 125 as oil bearings as discussed further herein below, greater forces may be exerted on upper radial bearings 123 and lower radial bearings 125 than in an embodiment utilizing drilling fluid cooled bearings. In some embodiments, one or more thrust bearings 127 may be positioned between driveshaft 101 and one or both of upper and lower bearing housings 107, 115. Thrust bearings 127 may, for example and without limitation, resist longitudinal force on driveshaft 101 such as weight on bit during a drilling operation. In some embodiments, upper radial bearings 123, lower radial bearings 125, and thrust bearings 127 may each include one or more of, for example and without limitation, diamond bearings, ball bearings, and roller bearings.

In some embodiments, one or more of upper radial bearing 123, lower radial bearing 125, and thrust bearings 127 may be oil-lubricated bearings. In such an embodiment, the annular portion of upper bearing housing bore 111 and lower bearing housing bore 119 about driveshaft 101 may be filled with oil. In some such embodiments, upper bearing housing bore 111 may include piston 129. Piston 129 may be an annular body adapted to seal between driveshaft 101 and upper bearing housing inner surface 113 and slidingly traverse longitudinally. In some such embodiments, piston 129 may separate upper bearing housing bore 111 into an oil filled portion, denoted 131 and a drilling fluid filled portion denoted 133. In some such embodiments, drilling fluid filled portion 133 may be fluidly coupled to upper bearing housing bore 111 such that pressure from drilling fluid positioned therein causes a corresponding increase in pressure within oil filled portion 131, thereby pressure balancing the oil lubricating one or more of upper radial bearing 123, lower radial bearing 125, and thrust bearings 127 with the surrounding wellbore. In some embodiments, one or more seals 135 may be positioned between one or more of driveshaft 101 and lower bearing housing 115, driveshaft 101 and upper bearing housing 107, driveshaft 101 and piston 129, and piston 129 and upper bearing housing 107. In some embodiments, one or more fluid paths 134 may be positioned to fluidly couple between upper bearing housing bore 111 and drilling fluid filled portion 133. In some such embodiments, fluid paths 134 may provide resistance to fluid flowing into drilling fluid filled portion 133 to, for example and without limitation, reduce fluid loss. In other embodiments, one or more high pressure seals may be positioned between piston 129 and upper bearing housing bore 111, and fluid paths 134 may not need to produce the resistance as described. In some embodiments, because oil-filled portion 131 is sealed from drilling fluid filled portion 133, bearing assembly 100 may be utilized with an air drilling operation or with highly abrasive or corrosive drilling fluid without compromising upper radial bearing 123, lower radial bearing 125, and thrust bearings 127.

In some embodiments, because driveshaft 101 is longitudinally aligned with and rotates along bore longitudinal axis $A_B$, driveshaft 101 and any bit coupled to bit box 103 thereof may rotate at angle α relative to bearing housing longitudinal axis $A_H$, and may therefore allow for a wellbore drilled thereby to be steered in a direction corresponding with the direction of angle α, defining a toolface of bearing assembly 100. In some embodiments, bend point ⊕ may be positioned at a location nearer to bit box 103 than coupler 105 of driveshaft 101. Positioning bend point ⊕ nearer to bit box 103 may, for example and without limitation, allow a drill bit coupled to bit box 103 to be positioned closer to bearing housing longitudinal axis $A_H$ while remaining oriented at angle α to bearing housing longitudinal axis $A_H$ than an embodiment in which bend point ⊕ is positioned closer to coupler 105. In such an embodiment, by positioning the drill bit closer to bearing housing longitudinal axis $A_H$, rotary drilling operations in which the entire drill string is rotated, the drill bit may cut more efficiently, as depicted in FIG. 10A, the bit orbit diameter $D_1$ is the same as the diameter of the drill bit.

In some embodiments, upper bearing housing 107 may include sensor pocket 112 formed therein. In some embodiments, sensor pocket 112 may be formed in upper bearing housing 107 at a radial orientation generally corresponding with the thickest portion of upper bearing housing 107. In some embodiments, sensor pocket 112 may be used to hold one or more sensors or other equipment including, for example and without limitation, one or more drilling mechanics sensors, drilling dynamics sensors, or logging while drilling sensors.

Figure 3:
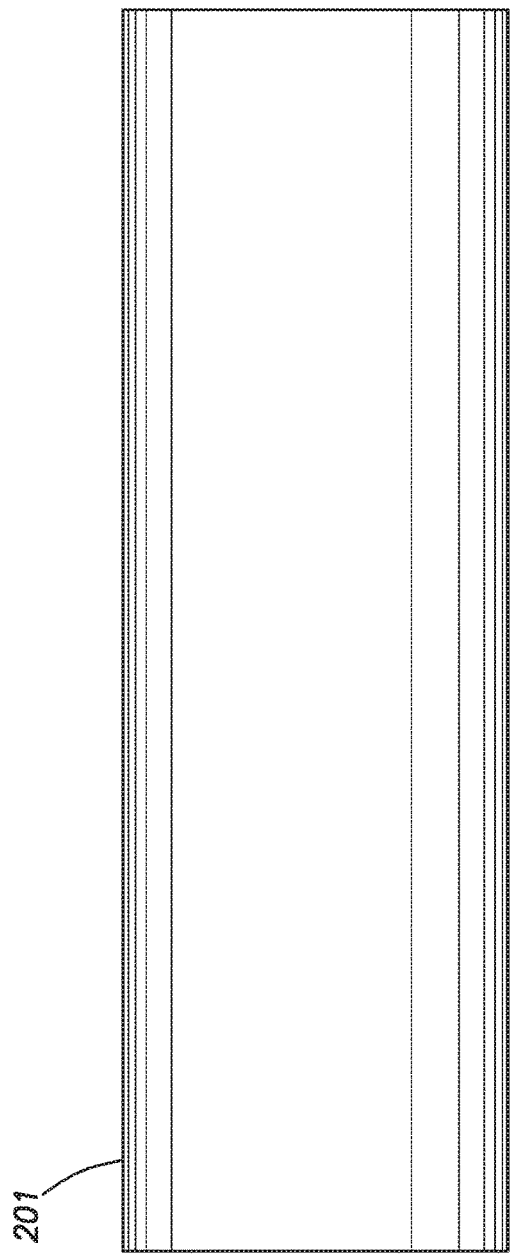
Figure 4:
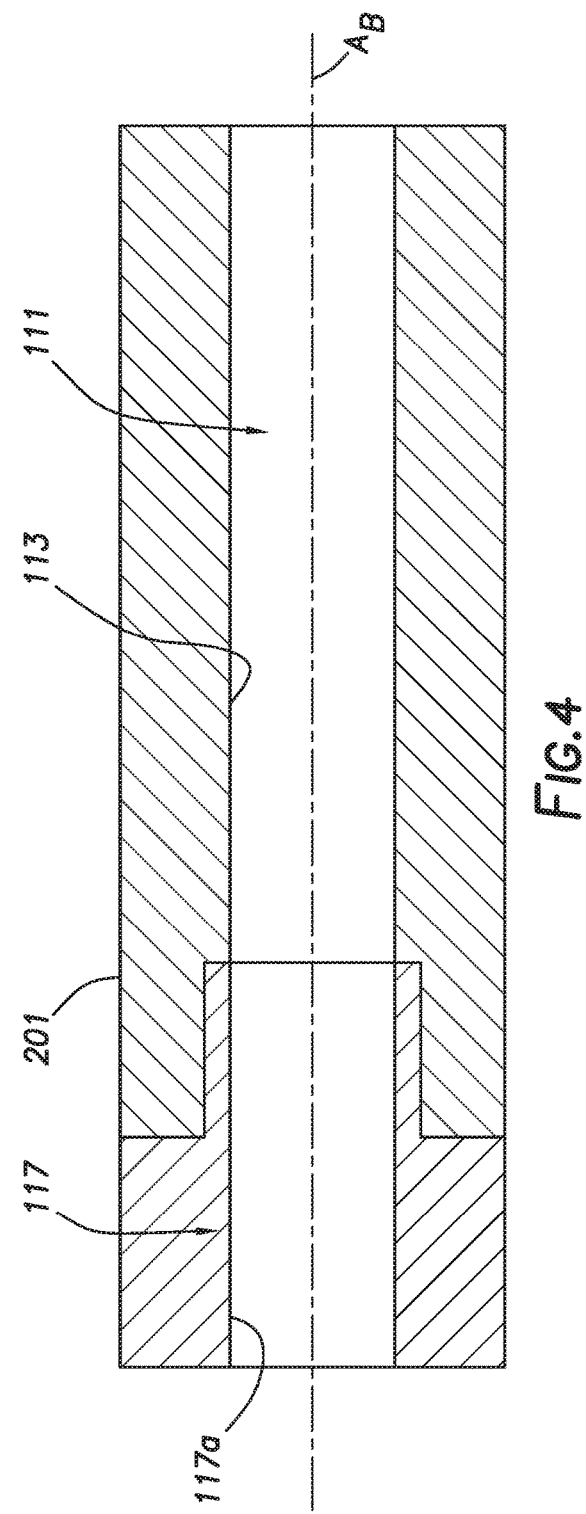

In some embodiments, and with respect to FIGS. 3-7, in order to form bearing assembly 100, upper housing blank 201 may be provided as depicted in FIG. 3. Upper housing blank 201 may be used as stock material for the formation of upper bearing housing 107 and may be generally cylindrical. Upper bearing housing bore 111 may be formed through upper housing blank 201 as depicted in FIG. 4. Upper bearing housing bore 111 may be formed along an axis concentric with the longitudinal axis of upper housing blank 201, defining bore longitudinal axis $A_B$. In some embodiments, female interface 117a of threaded interface 117 or any corresponding portion of a coupler, as discussed herein above, may be formed in upper housing blank 201 also along bore longitudinal axis $A_B$.

Lower housing blank 203 may be mechanically coupled to upper housing blank 201 at threaded interface 117 as depicted in FIG. 5. Lower housing blank 203 may already be formed having male interface 117b of threaded interface 117 or any corresponding portion of a coupler as discussed herein above. In some embodiments, lower housing blank 203 may be tubular already having lower bearing housing bore 119 formed therein such that lower bearing housing bore 119 is concentric with bore longitudinal axis $A_B$ when lower housing blank 203 is coupled to upper housing blank 201.

In some embodiments, outer surface 205 of upper housing blank 201 and lower housing blank 203 may be machined as depicted in FIG. 6. In some such embodiments, outer surface 205 may be turned, for example, on a lathe to form one or both of upper bearing housing outer surface 109 and lower bearing housing outer surface 110. One or both of upper bearing housing outer surface 109 and lower bearing housing outer surface 110 may be formed such that they are generally cylindrical and oriented longitudinally on bearing housing longitudinal axis $A_H$ at angle α to bore longitudinal axis $A_B$. In some embodiments, one or both ends of 207, 209 of upper housing blank 201 and lower housing blank 203 respectively may be machined such that they are formed in a plane normal to bearing housing longitudinal axis $A_H$. In some embodiments, end 209 of lower bearing housing 115 may be left unmachined such that it is parallel to the drill bit coupled to bit box 103. The result of the machining operations may therefore result in bearing assembly 100 as depicted in FIG. 7.

Figure 7A:
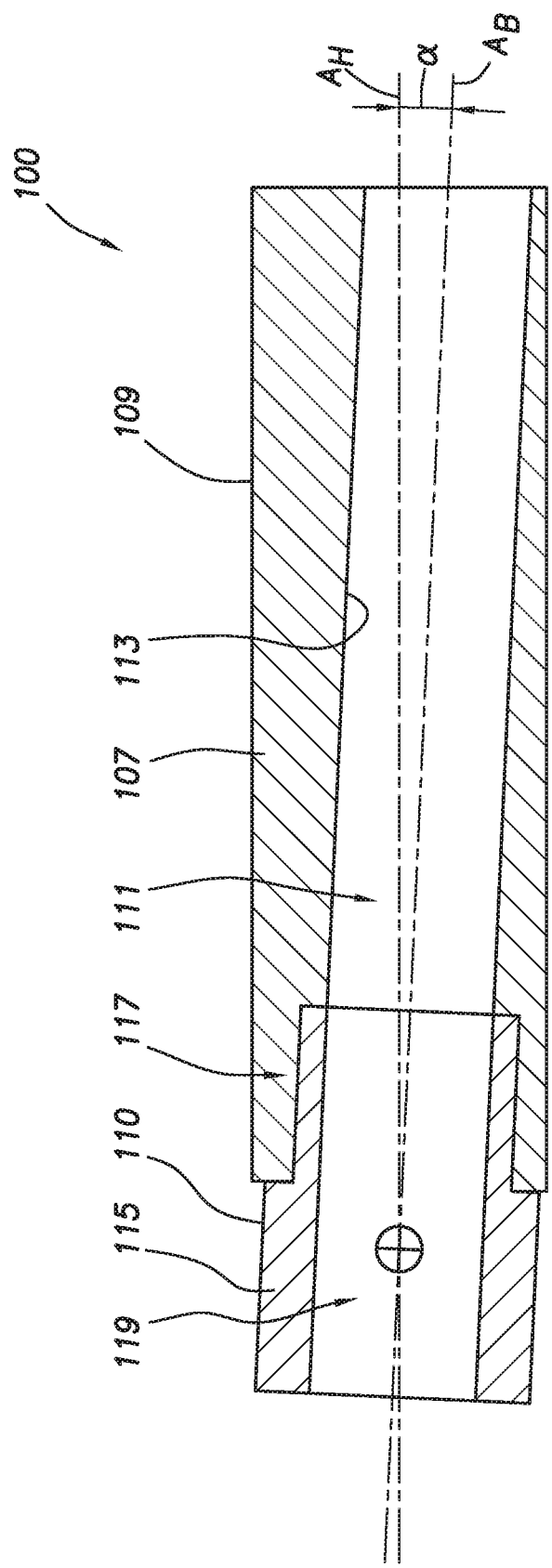
FIG. 7A depicts a bearing assembly consistent with at least one embodiment of the present disclosure.

In some embodiments, lower housing blank 203 may be formed into the desired configuration of lower bearing housing 115 before installation to upper housing blank 201 prior to installation to upper housing blank 201. In some such embodiments, lower bearing housing 115 may not be machined as described previously. In some such embodiments, as depicted in FIG. 7A, lower bearing housing 115 may be a standard lower bearing housing such that lower bearing housing bore 119 is concentric with lower bearing housing outer surface 110.

Figure 11A:
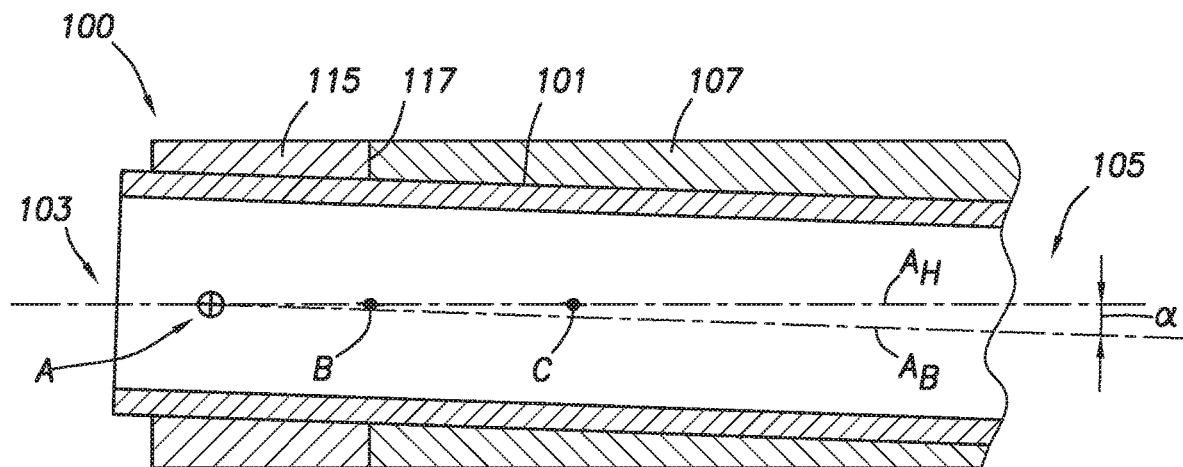
FIGS. 11A-C depict various configurations of bearing assemblies each consistent with at least one embodiment of the present disclosure.
Figure 11B:
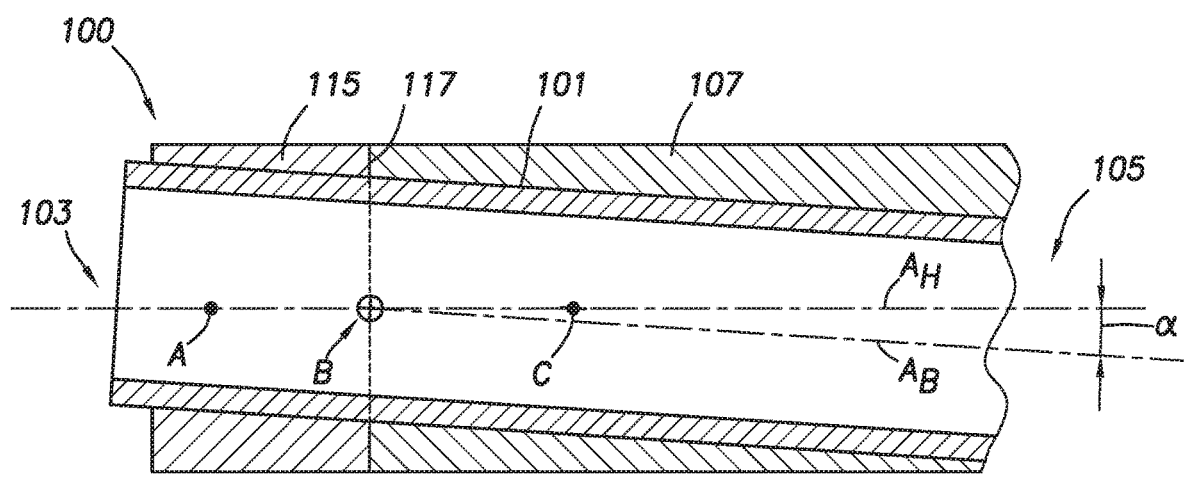
Figure 11C:
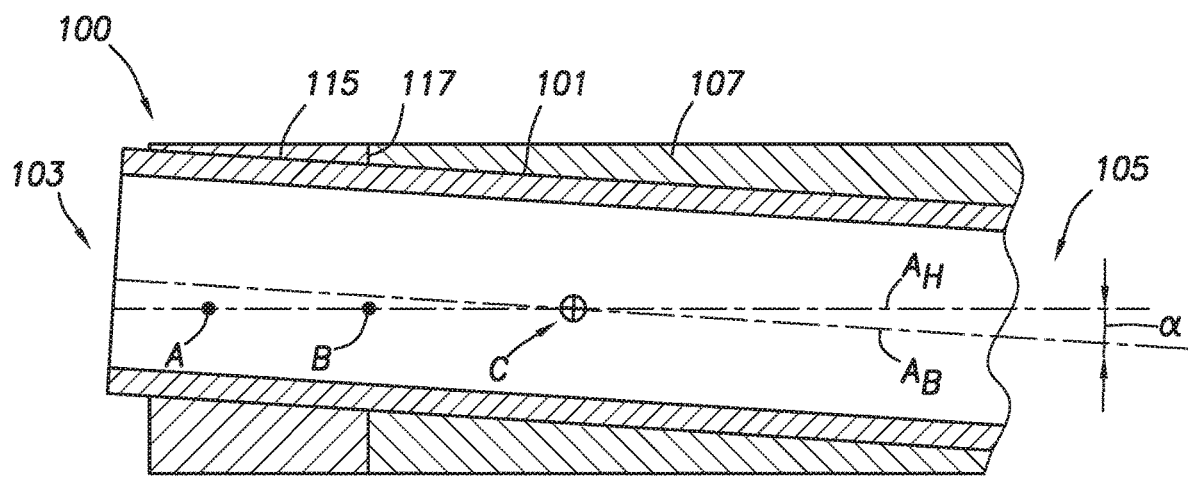

In some embodiments, as depicted in FIGS. 11A-C, bearing assembly 100 may be formed such that bend point ⊕ is at a desired location along driveshaft 101, discussed herein as between bit box 103 and coupler 105 of driveshaft 101. In some embodiments, bend point ⊕ may be positioned at a location (labeled location B) that is substantially aligned with the connection between lower bearing housing 115 and upper bearing housing 107 as depicted in FIG. 11B. In such an embodiment, lower bearing housing 115 and upper bearing housing 107 may be formed separately as discussed herein above with respect to FIG. 7A as the need to time lower bearing housing 115 and upper bearing housing 107 in order to properly form a seal therebetween while allowing rotation of driveshaft 101 is minimized. In such an embodiment, lower bearing housing 115 and upper bearing housing 107 may be interchangeable with other such components. In some such embodiments, lower bearing housing 115 may be substantially concentric with bore longitudinal axis $A_B$.

In some embodiments, bend point ⊕ may be positioned at a location (labeled location A) that is closer to bit box 103 than location B as depicted in FIG. 11A. In such an embodiment, the bit orbit diameter as further discussed herein below may be reduced from a bend point ⊕ located further from bit box 103. In such an embodiment, lower bearing housing 115 and upper bearing housing 107 may be machined together as discussed herein above.

In some embodiments, bend point ⊕ may be positioned at a location (labeled location C) that is closer to coupler 105 than location B as depicted in FIG. 11C. In such an embodiment, feasible maximum angles α may be increased over a bend point ⊕ positioned closer to bit box 103.

Figure 8:
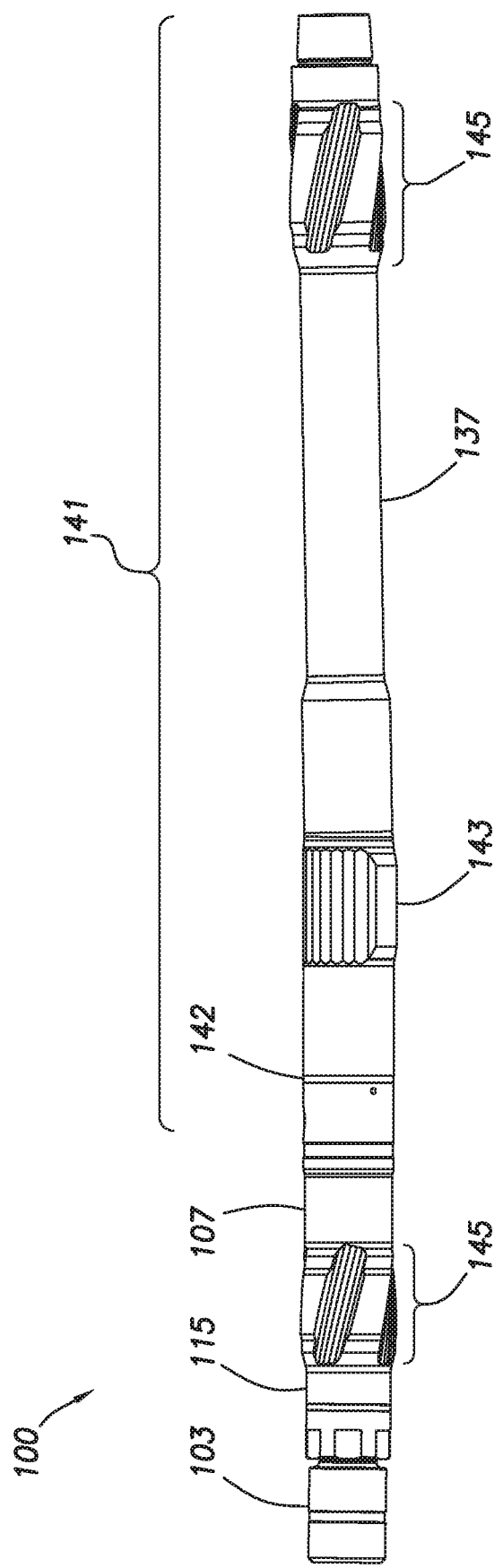
FIG. 8 depicts an elevation view of a bottom hole assembly (BHA) consistent with at least one embodiment of the present disclosure.
Figure 9:
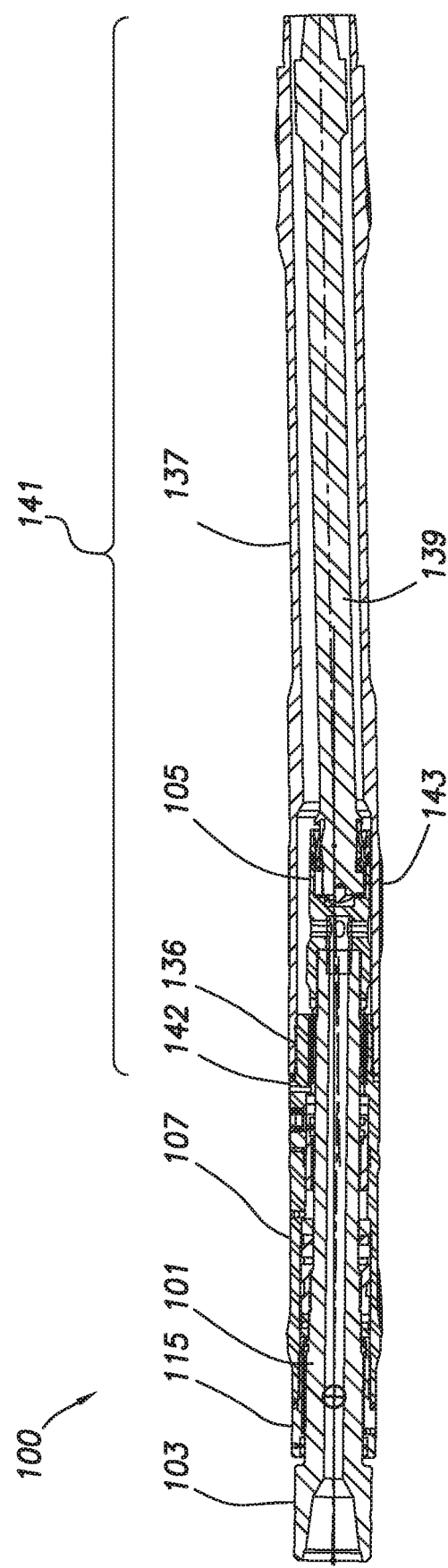
FIG. 9 depicts a cross section view of the BHA of FIG. 8.

In some embodiments, as depicted in FIGS. 8, 9, bearing assembly 100 may be coupled to transmission housing 137 by upper coupler 136 forming BHA. Transmission housing 137 may couple between upper bearing housing 107 and a power section which may include a downhole motor such as a mud motor, turbine, gear-reduced turbine, or electric motor. Transmission shaft 139 may be positioned within transmission housing 137 and may couple to coupler 105 of driveshaft 101 to, for example and without limitation, transfer rotational power to driveshaft 101. In some embodiments, transmission housing 137 may be formed such that it includes a bend and therefore forms bent sub 141. In some embodiments, the direction of bend of bent sub 141 may be positioned such that it is aligned with the toolface of bearing assembly 100, thereby increasing the effective bend of bearing assembly 100. In some embodiments, a scribe line may be formed on an outer surface of one or both of bearing assembly 100 and transmission housing 137 in alignment with the direction of bend such that bearing assembly 100 and transmission housing 137 may be properly aligned. In some embodiments, timing ring 142 may be positioned between transmission housing 137 and bearing assembly 100 to ensure the alignment. In some embodiments, as depicted in FIG. 8, bearing assembly 100 or transmission housing 137 may include contact pad 143 on an outer surface thereof. In some embodiments, contact pad 143 may be positioned on a side of bearing assembly 100 or transmission housing 137 opposite the toolface thereof. Contact pad 143 may contact the surrounding wellbore and may, for example and without limitation, assist with directional drilling.

In some embodiments, as depicted in FIG. 10B, by using both an internal bend of bearing assembly 100 and the external bend of bent sub 141, the drill bit may be positioned at a desired bit angle γ relative to drill string longitudinal axis $A_D$ made up of angle β between drill string longitudinal axis $A_D$ and bearing housing longitudinal axis $A_H$ and angle α between bore longitudinal axis $A_B$ and bearing housing longitudinal axis $A_H$. In some embodiments, bit orbit diameter $D_2$ for a given bit angle γ may be less than the bit orbit diameter D' of a drilling bit of a BHA having only a bent sub 141 having the same bit angle γ' as depicted in FIG. 10C. By reducing bit orbit diameter $D_2$, the drill string may be rotatable at a higher RPM, thereby increasing rate of penetration while forming the wellbore in rotary mode. For example, in some cases, a bit angle γ' of a BHA having only a bent sub 141 may be limited in its ability to rotate or limited in maximum rotation speed within the wellbore depending on the bit angle γ' due to the increase in bit orbit diameter D'. In some embodiments as depicted in FIG. 10B, a desired bit angle γ may be made up of angle α and angle β, thereby allowing the angle β of bent sub 141 to be reduced, thereby increasing the ability to rotate and the maximum speed of rotation due, for example and without limitation, to reduced side loading and cyclical fatigue. Additionally, wellbore cleaning, weight transfer, friction, and rate of penetration may likewise be increased. In some embodiments, for example and without limitation, angle α may range between 0.1° and 3°. In some embodiments, for example and without limitation, angle β may range between 0° (a straight sub) and 3°.

In some embodiments, as depicted in FIGS. 2, 8, bearing assembly 100 may include one or more stabilizers 145.

Figure 12A:
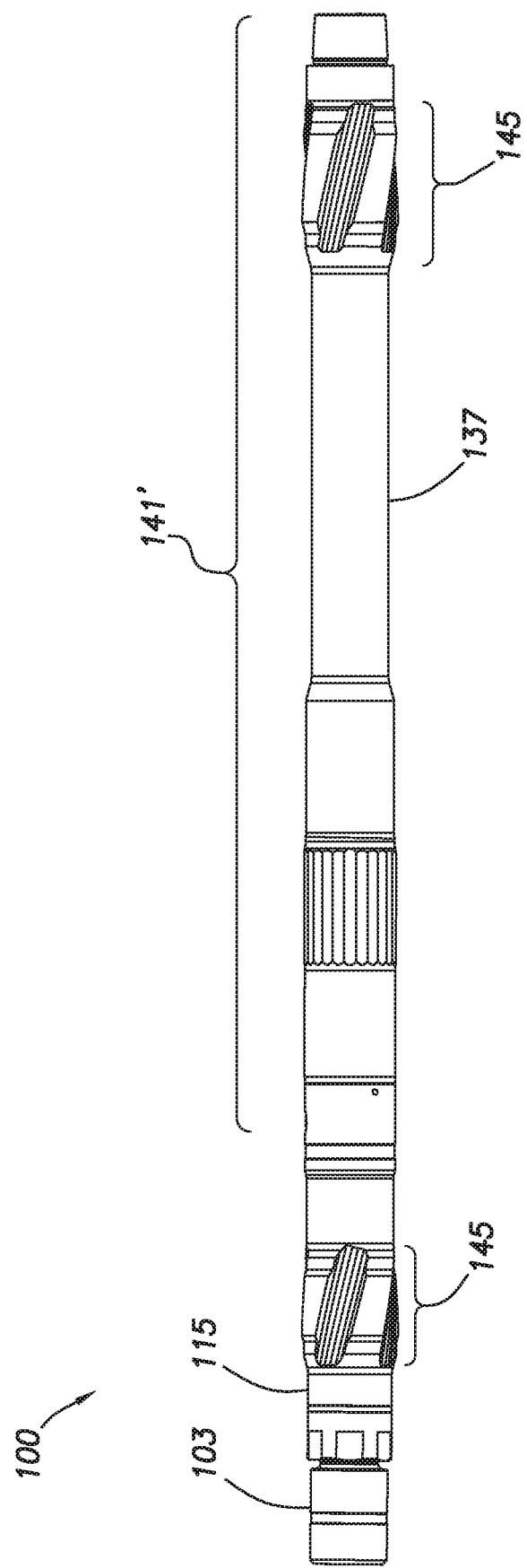
FIG. 12A depicts an elevation view of a bottom hole assembly (BHA) consistent with at least one embodiment of the present disclosure.
Figure 12B:
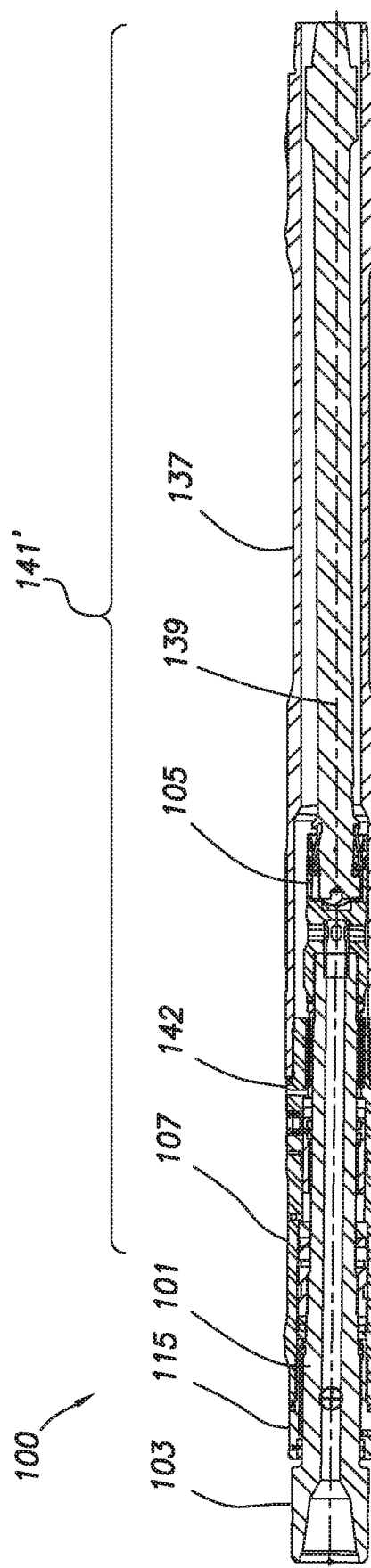
FIG. 12B depicts a cross section view of the BHA of FIG. 12A.

In some embodiments, bearing assembly 100 may be used to drill a vertical or otherwise straight wellbore. In some embodiments, bearing assembly 100 may be operated in rotary mode in which the drill string to which bearing assembly 100 is coupled is rotated and driveshaft 101 is not rotated relative to the rest of bearing assembly 100. In some embodiments, bearing assembly 100 may be used with straight sub 141' as depicted in FIGS. 12A, 12B or an adjustable sub set to a substantially 0° bend as opposed to bent sub 141 as discussed herein above, although one having ordinary skill in the art with the benefit of this disclosure will understand that bearing assembly 100 may be used with bent sub 141 in the rotary mode. In other embodiments, driveshaft 101 may be rotated simultaneously with the drill string to which bearing assembly 100 is coupled.

Figure 13:
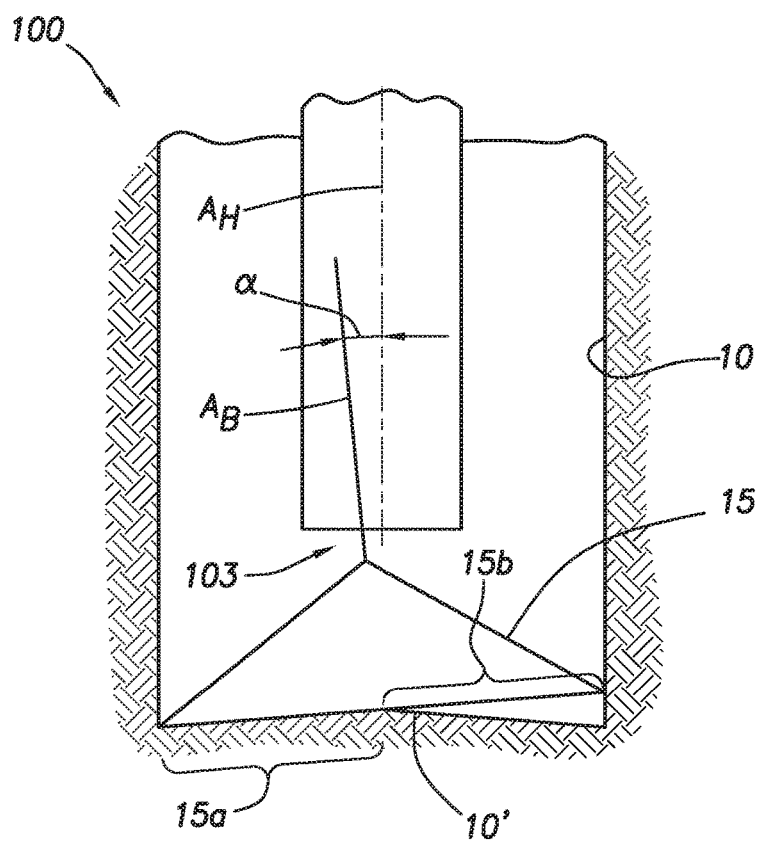
FIG. 13 depicts a schematic view of a bearing assembly consistent with at least one embodiment of the present disclosure drilling a vertical wellbore.

In such an embodiment, as depicted in FIG. 13, drill bit 15 may be rotated relative to wellbore 10 both by rotation of drive shaft 101 along bore longitudinal axis $A_B$ and by rotation of bearing assembly 100 along bearing housing longitudinal axis $A_H$. In such an embodiment, only a portion of the cutting surface of drill bit 15, depicted as engaged cutting surface 15a, may be in contact with the formation of wellbore 10. In some embodiments, the rest of the cutting surface of drill bit 15, depicted as disengaged cutting surface 15b, is not in contact with the formation. In such an embodiment, disengaged cutting surface 15b may be in contact with drilling fluid and may, for example and without limitation, be able to be cooled while not in contact with the formation. In some embodiments, engaged cutting surface 15a may be moved between entering the formation and achieving full depth of cut in 90° of rotation. In some such embodiments, where a cutting element positioned on drill bit 15 may create a point loading pressure on the formation upon entering the formation utilizing a standard bit. In such an embodiment, the duration of point loading on the formation may be adjusted by varying the rotation of driveshaft 101 and bearing assembly 100. In some embodiments, by forming wellbore 10 in this way, a conical profile 10' may be formed in the formation which may, for example and without limitation, reduce torque requirements and vibration during a drilling operation. In some embodiments, conical profile 10' may, for example and without limitation, assist with maintaining verticality or straightness of wellbore 10.

Figure 14:
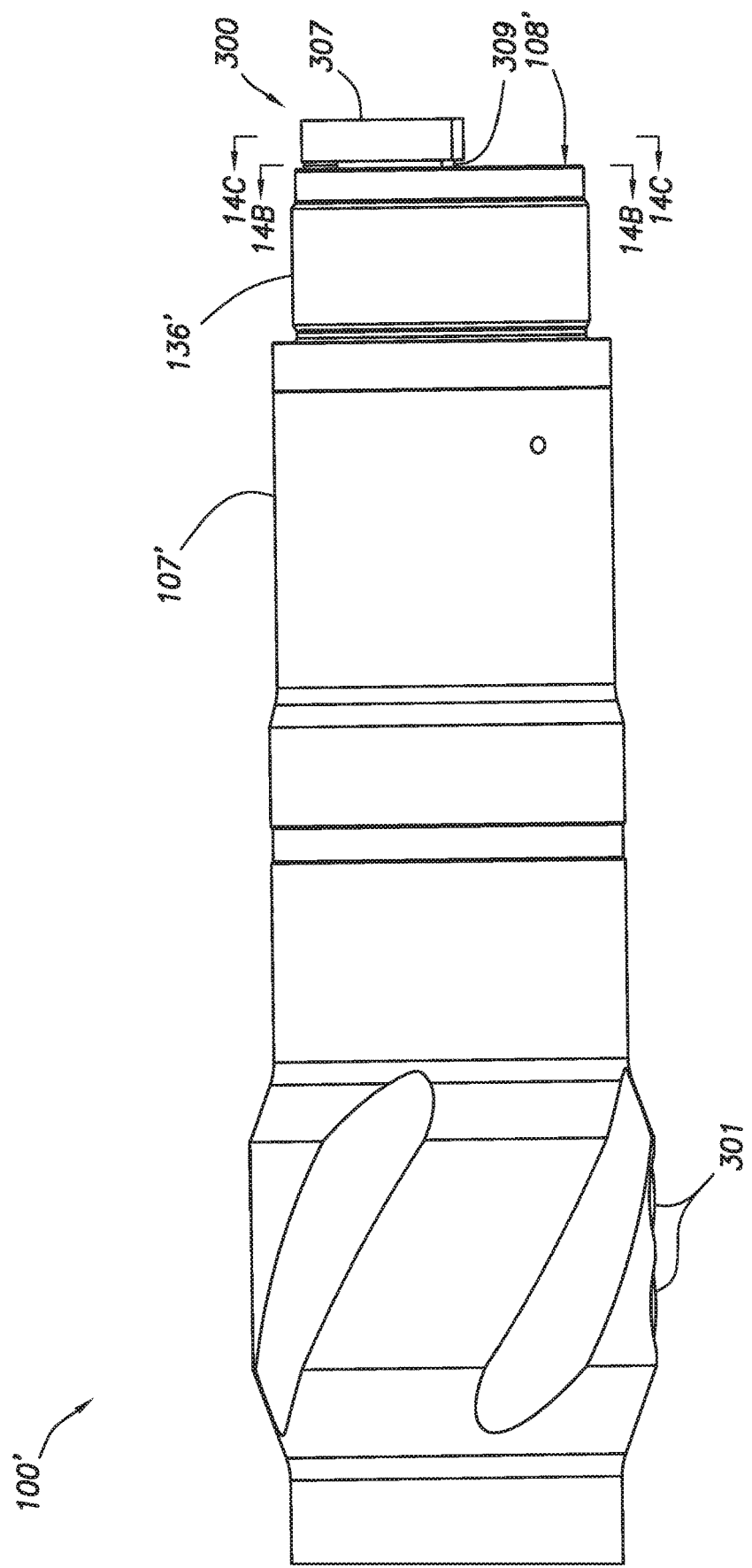
FIG. 14 depicts an elevation view of a bearing assembly consistent with at least one embodiment of the present disclosure.
Figure 14A:
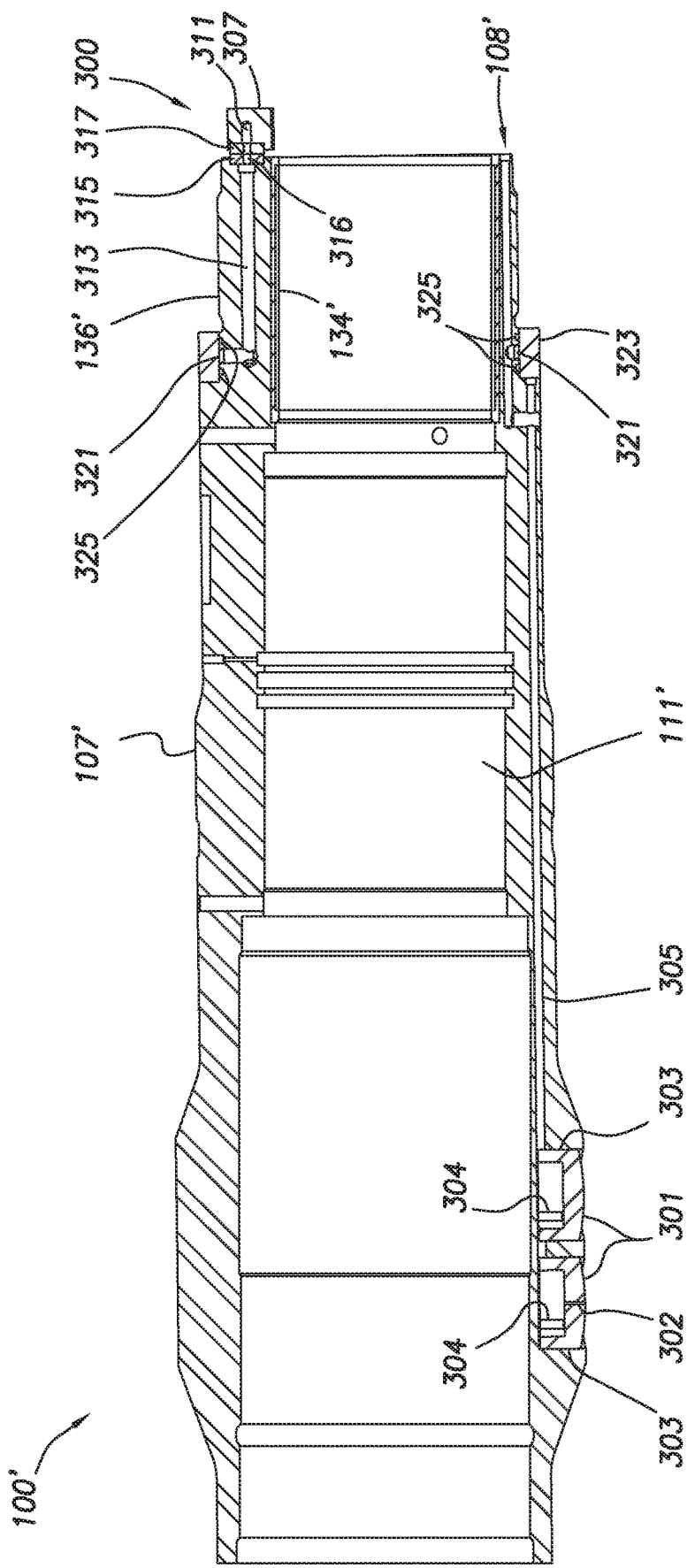
FIG. 14A depicts a longitudinal cross section view of the bearing assembly of FIG. 14.
Figure 14C:
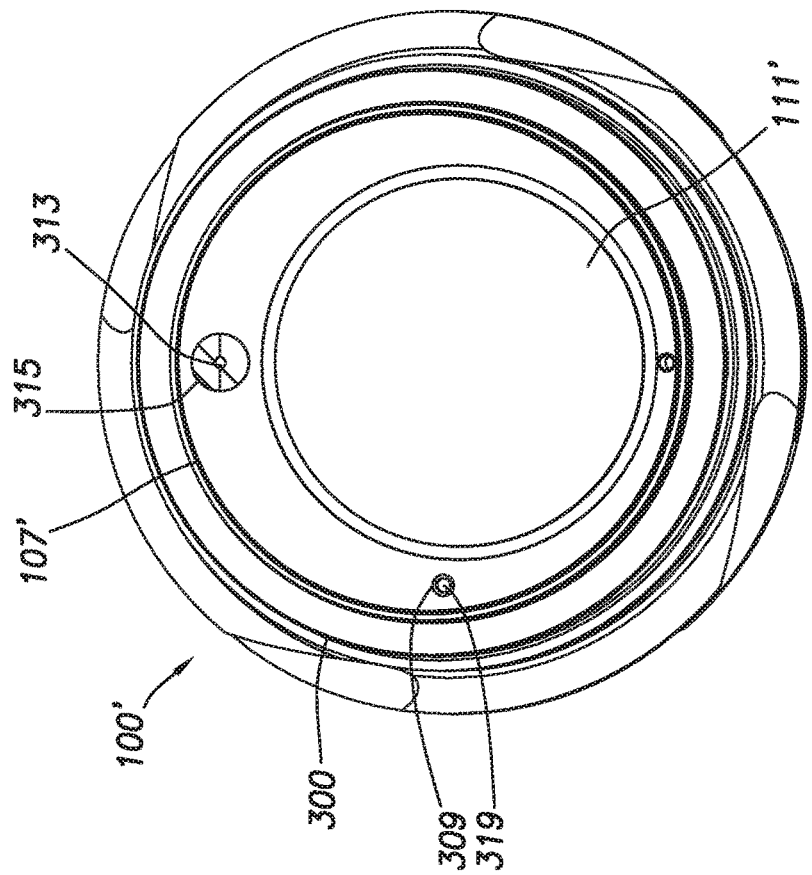
FIG. 14C depicts a cross section view of the bearing assembly of FIG. 14 along line C-C.

In some embodiments, as depicted in FIGS. 14-25, bearing assembly 100' may further include control valve assembly 300. Control valve assembly 300 may be used to operate control pistons 301. Control pistons 301 may be positioned within control piston cylinders 303 formed in an outer surface of control valve assembly 300. In some embodiments, control pistons 301 may be adapted to extend by fluid pressure supplied to control piston cylinders 303 through control port 305 by control valve assembly 300. In some embodiments, control pistons 301 may be adapted to extend from a side of bearing assembly 100' and contact the surrounding wellbore substantially opposite to the toolface of bearing assembly 100'. In some embodiments, control valve assembly 300 may supply fluid pressure to control piston cylinders 303 from the interior of upper bearing housing 107' while bearing assembly 100' is used in the sliding mode, and may reduce or prevent fluid pressure from reaching control piston cylinders 303 while bearing assembly 100' is used in the rotary mode as described further herein below. In some embodiments, one or more of control pistons 301 may include exhaust ports 302 as depicted in FIG. 14A. Exhaust ports 302 may be positioned to vent fluid pressure from within control piston cylinders 303 to the surrounding wellbore. In some embodiments, exhaust ports 302 may allow control pistons 301 to retract once fluid pressure is no longer supplied to control piston cylinders 303. In some embodiments, exhaust ports 302 may be configured such that the flow through exhaust ports 302 is approximately one third of the flow through output port 313 of control valve assembly 300 as discussed below. In some embodiments, control pistons 301 may be retracted by contact with the surrounding wellbore. In some embodiments, one or more piston retraction mechanisms 304 may be positioned to bias control pistons 301 into the retracted position. Piston retraction mechanisms 304 may include, for example and without limitation, one or more springs.

Figure 14B:
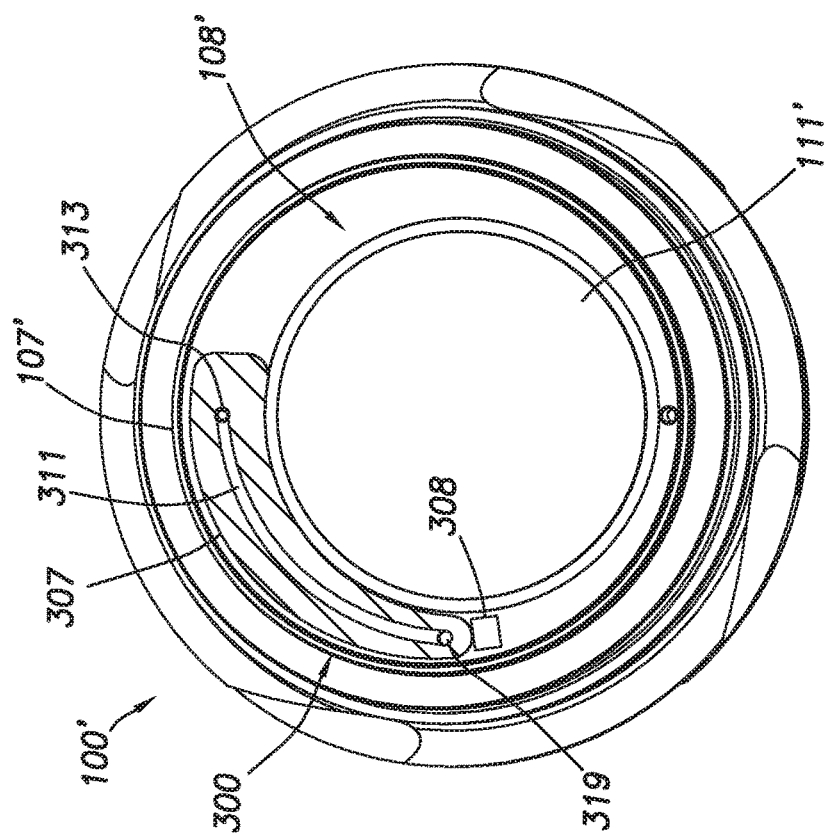
FIG. 14B depicts a cross section view of the bearing assembly of FIG. 14 along line B-B.
Figure 15:
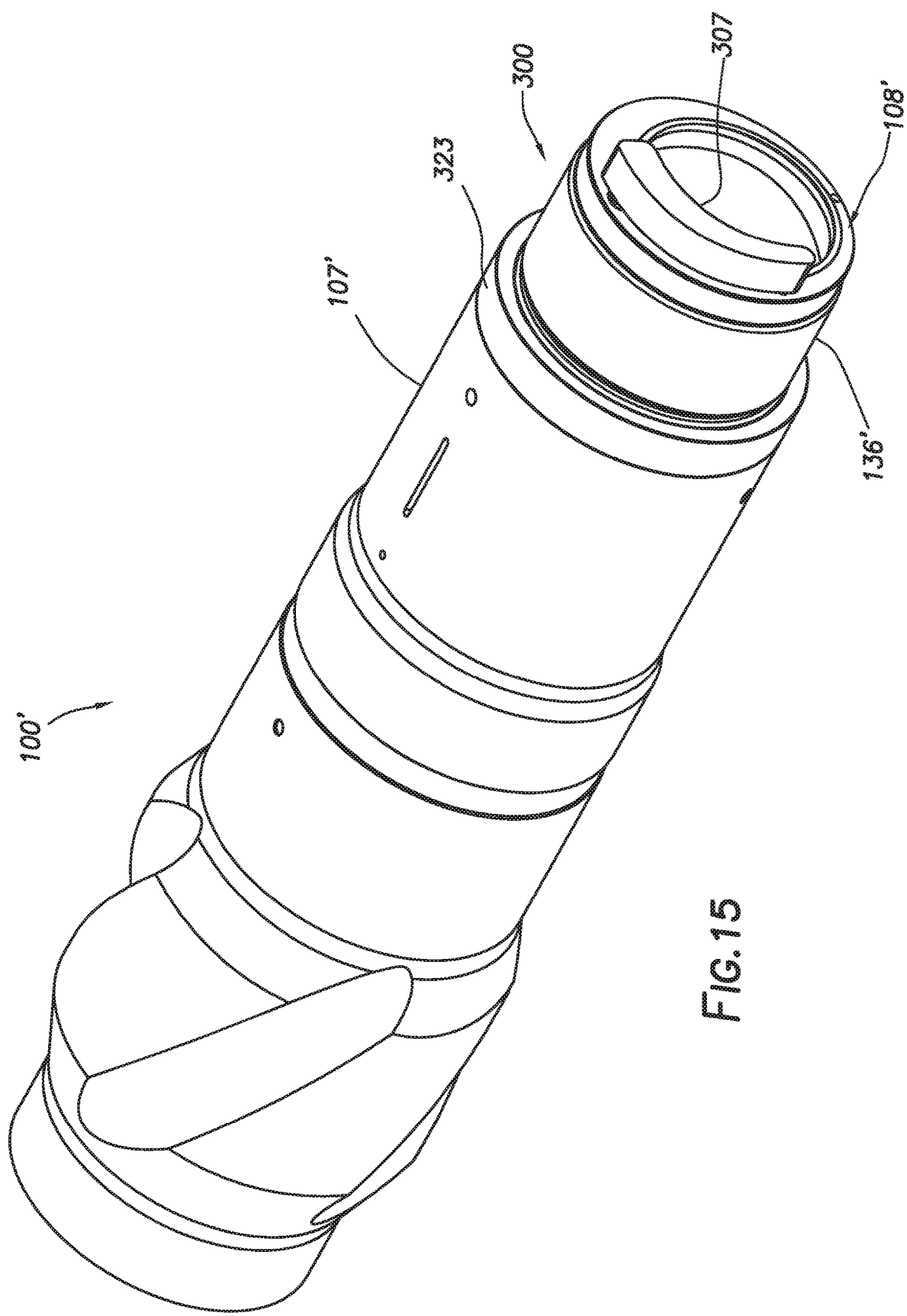
FIG. 15 depicts a perspective view of the bearing assembly of FIG. 14.
Figure 16:
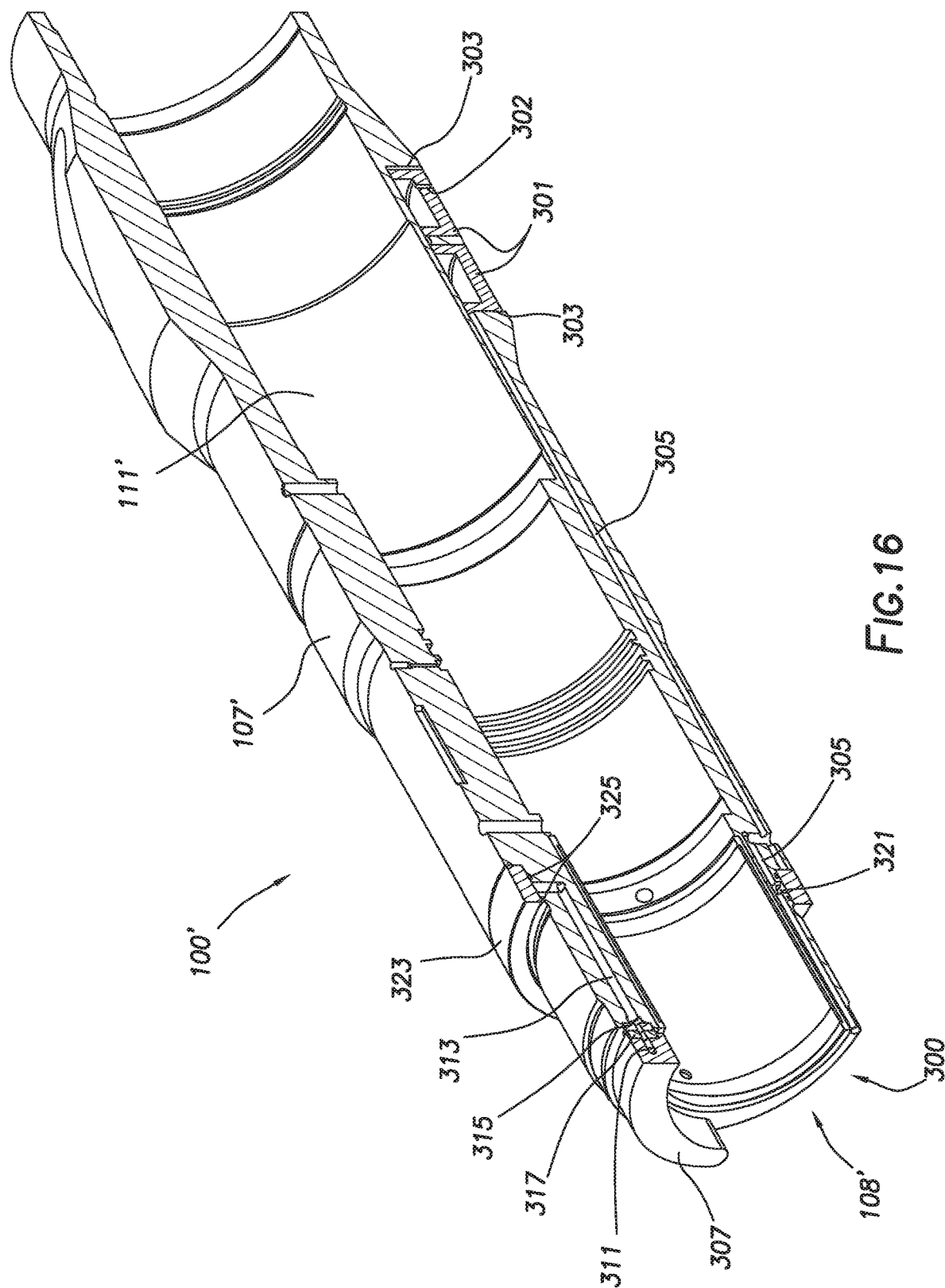
FIG. 16 depicts a cross sectional perspective view of the bearing assembly of FIG. 14.
Figure 19:
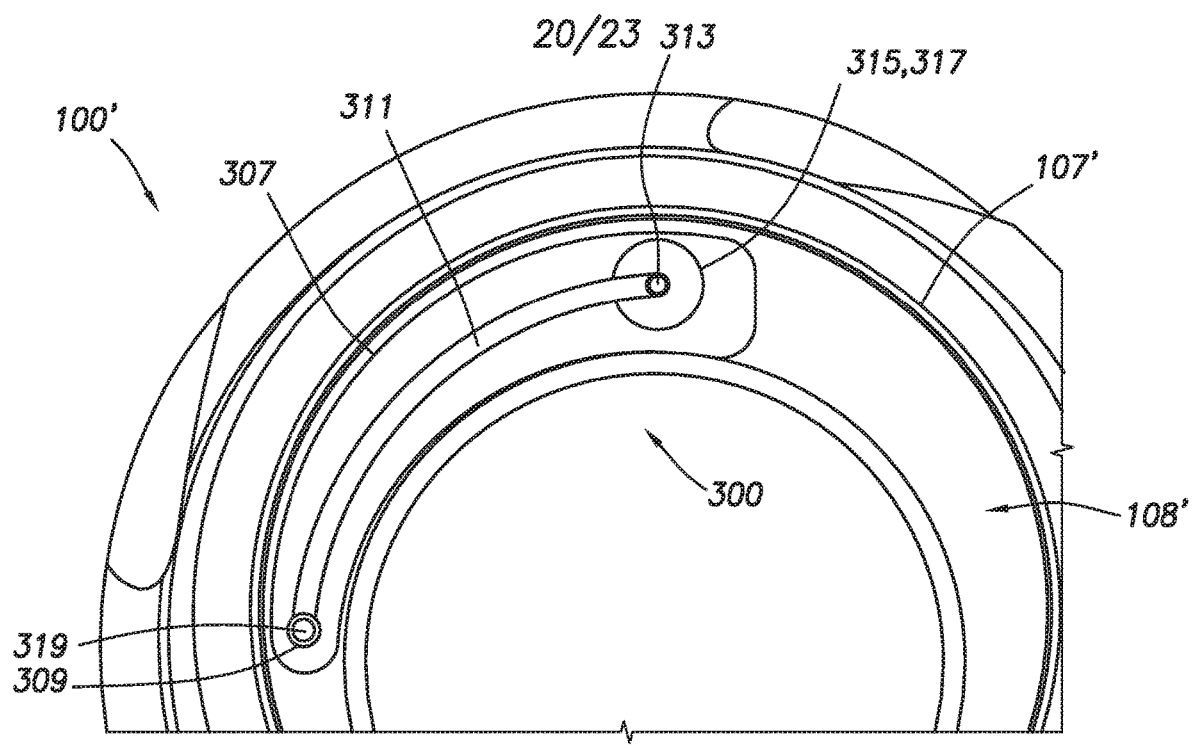
FIG. 19 depicts a partially transparent end view of the control valve of FIG. 17 in an open position.

In some embodiments, control valve assembly 300 may be positioned at upper coupler 136' of bearing assembly 100'. Control valve assembly 300 may include valve actuator 307. Valve actuator 307 may be coupled to the upper end 108' of upper bearing housing 107' above upper coupler 136'. Valve actuator 307 may be pivotably coupled to upper bearing housing 107' by pivot pin 309. Valve actuator 307 may be formed as an annular segment corresponding with upper end 108' of upper bearing housing 107' such that valve actuator 307 may pivot between an open position (as depicted in FIG. 19) and a closed position (as depicted in FIG. 21). Valve actuator 307 may be adapted to remain in the open position while bearing assembly 100' is used in the sliding mode. In some embodiments, valve actuator 307 may be moved from the open position to the closed position (through the intermediary position depicted in FIG. 20) by rotational forces, including, for example and without limitation, centrifugal force, as bearing assembly 100' is used in the rotary mode as the rotation rate of bearing assembly 100' increases above a desired rotation rate. In some embodiments, one or more actuator return mechanisms 308 (as shown in FIG. 14B) may be included to bias valve actuator 307 to the open position as rotation of bearing assembly 100' slows or stops. Actuator return mechanisms 308 may include, for example and without limitation, one or more springs, weights, inclined planes, or may be returned hydraulically using, for example and without limitation, pressure from the drilling fluid.

In some embodiments, valve actuator 307 may include valve port 311 as depicted in FIGS. 14B and 18-21. In some embodiments, valve port 311 may be a hole formed through valve actuator 307. In some embodiments, valve port 311 may be formed as a slot or groove in valve actuator 307 positioned to seal against the end of upper bearing housing 107'. In some embodiments, valve actuator 307 and the upper end 108' of upper bearing housing 107' may include one or more seals or may be formed from or include one or more bodies to define a seal such as a diamond-to-diamond seal. In some such embodiments, one or more bearings or bushings such as diamond inserts may be positioned between valve actuator 307 and the upper end 108' of upper bearing housing 107'. Such a bearing or bushing may, for example and without limitation, act as a thrust bearing to reduce friction between valve actuator 307 and upper bearing housing 107' as valve actuator 307 pivots. In some embodiments, valve actuator 307 may be formed from multiple subcomponents. In such an embodiment, one or more subcomponents of valve actuator 307 may include a slot or groove, and the subcomponents may be coupled. In some embodiments, a seal such as an O-ring seal may be positioned between the subcomponents in order to form valve port 311.

Figure 22:
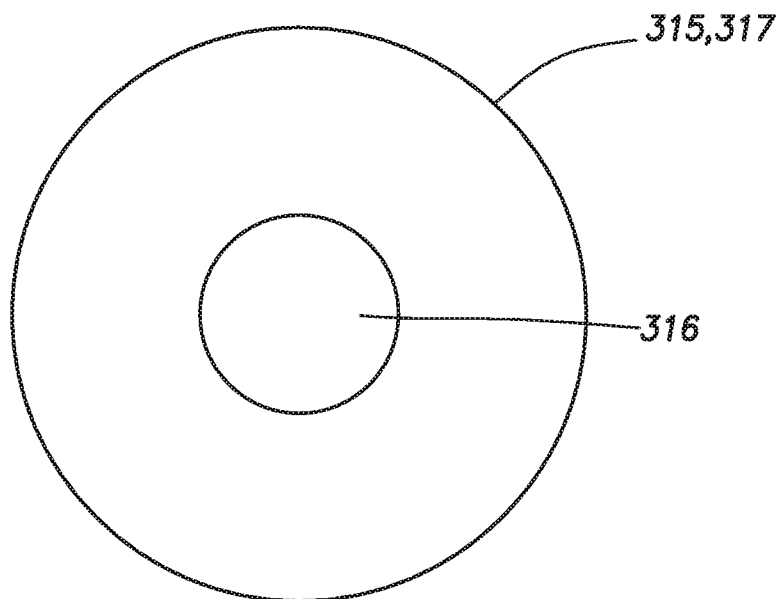
FIG. 22 is an end view of valve inserts consistent with at least one embodiment of the present disclosure.
Figure 23:
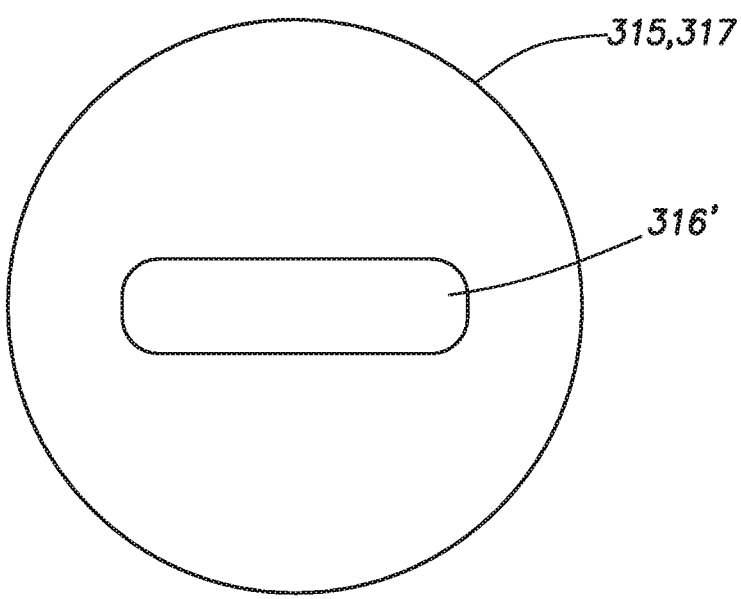
FIG. 23 is an end view of valve inserts consistent with at least one embodiment of the present disclosure.

In some embodiments, control valve assembly 300 may include output port 313 formed in upper bearing housing 107'. In such an embodiment, output port 313 may open to the upper end 108' of upper bearing housing 107' such that valve port 311 is aligned with and in fluid communication with output port 313 when valve actuator 307 is in the open position and such that valve port 311 is not in fluid communication with output port 313 when valve actuator 307 is in the closed position. In some embodiments, one or both of valve actuator 307 and upper bearing housing 107' may include one or more valve inserts 315, 317 aligned with valve port 311 and output port 313. Valve inserts 315, 317 may include insert ports 316 to allow fluid communication between valve port 311 and output port 313 when insert ports 316 are aligned. Valve inserts 315, 317 may, in some embodiments, form a seal to prevent fluid communication between valve port 311 and output port 313 when valve actuator 307 is in the closed position and insert ports 316 are out of alignment. In some such embodiments, valve inserts 315, 317 may be formed from, for example and without limitation, PDC such that a diamond-to-diamond seal is formed. In some embodiments, as depicted in FIG. 22, valve inserts 315, 317 may be configured such that insert ports 316 are round openings therethrough to fluidly couple valve port 311 and output port 313. In some embodiments, as depicted in FIG. 23, valve inserts 315, 317 may be configured such that insert ports 316' are oblong or ovoid.

Figure 17:
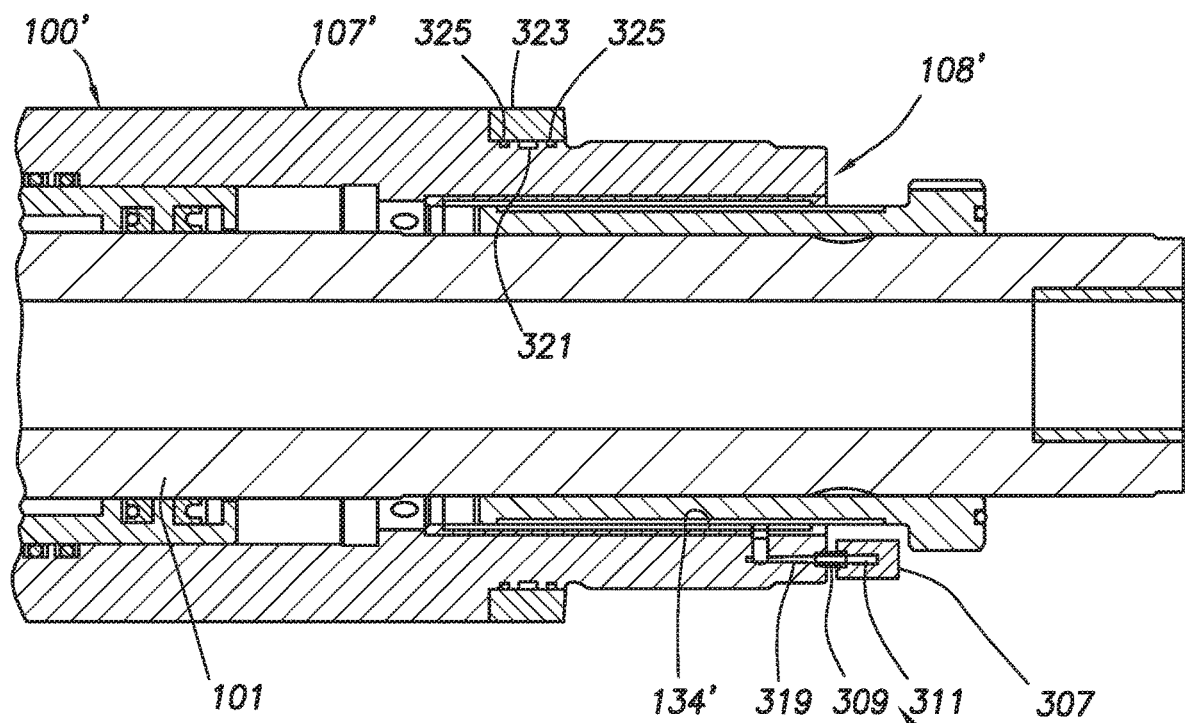
FIG. 17 depicts a detail view of a control valve assembly consistent with at least one embodiment of the present disclosure of the bearing assembly of FIG. 14.
Figure 18:
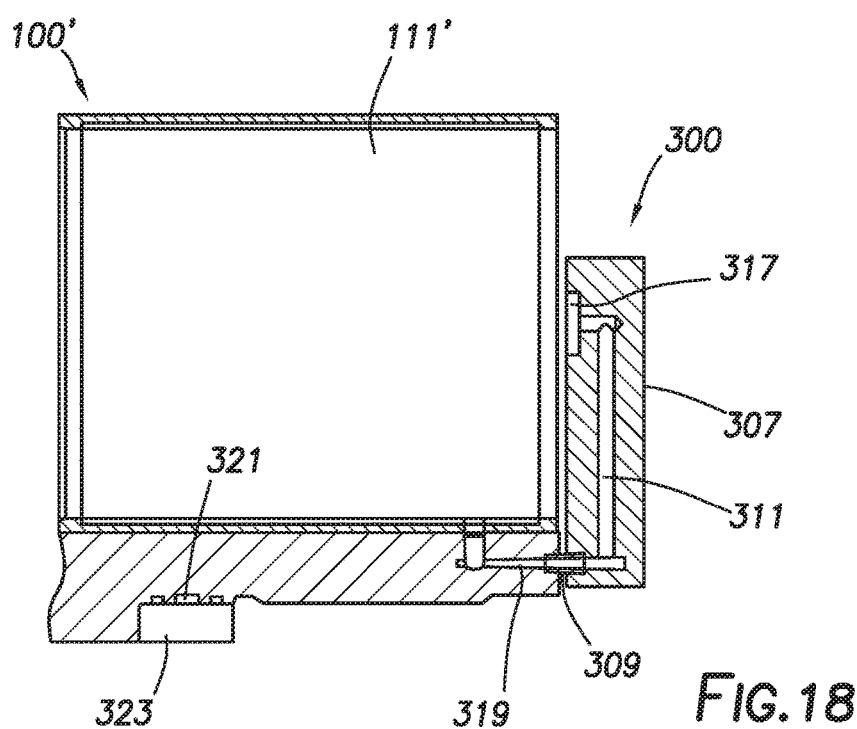
FIG. 18 depicts a partially transparent cross section view of the control valve of FIG. 17.

In some embodiments, control valve assembly may include fluid supply port 319 formed in upper bearing housing 107'. Fluid supply port 319 may fluidly couple between an interior of bearing assembly 100' and valve port 311 as depicted in FIGS. 17 and 18. In some embodiments, fluid supply port 319 may fluidly couple to fluid paths 134' as described above. In some embodiments, pivot pin 309 may be tubular and in fluid communication with both fluid supply port 319 and valve port 311 such that fluid communication between fluid supply port 319 and valve port 311 is supplied through pivot pin 309.

Output port 313 may be in fluid communication with control port 305 such that fluid pressure supplied by control valve assembly 300 reaches control piston cylinders 303 to extend control pistons 301. In some embodiments, output port 313 may be formed substantially opposite to the direction of offset between upper bearing housing bore 111' and upper bearing housing 107', i.e. at a radial position in upper bearing housing 107' where the wall thickness of upper bearing housing 107' is largest. In some embodiments, control port 305 may be formed at a different radial position than output port 313. In some such embodiments, control valve assembly 300 may include annular flowpath 321 defined between upper bearing housing 107' and pressure ring 323. Annular flowpath 321 may be in fluid communication with output port 313 and control port 305, therefore allowing fluid communication therebetween. In some embodiments, one or more seals 325 may be positioned between pressure ring 323 and upper bearing housing 107'.

Figure 24:
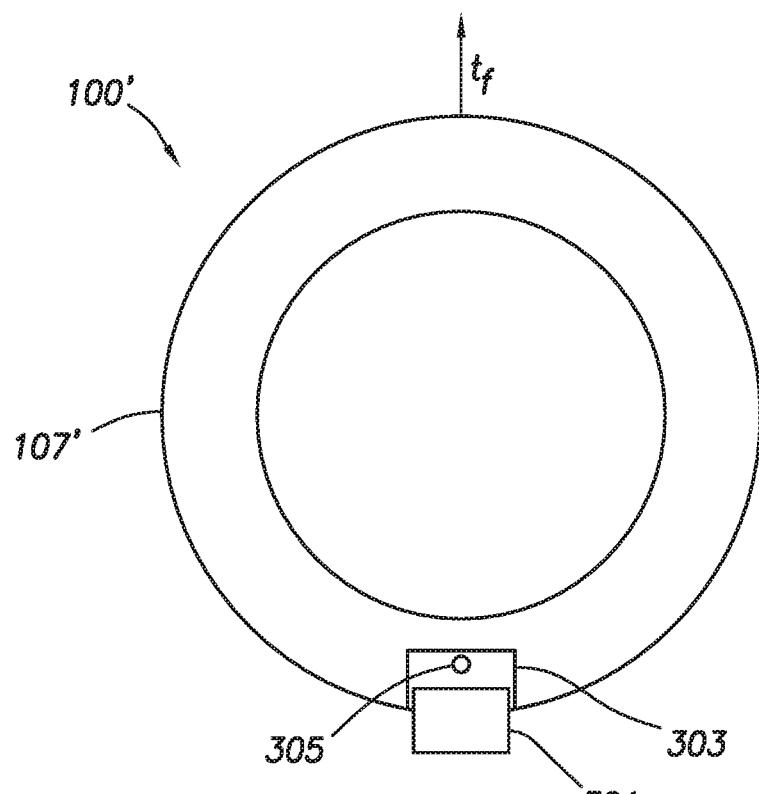
FIG. 24 is a schematic view of a bearing assembly consistent with at least one embodiment of the present disclosure.
Figure 25:
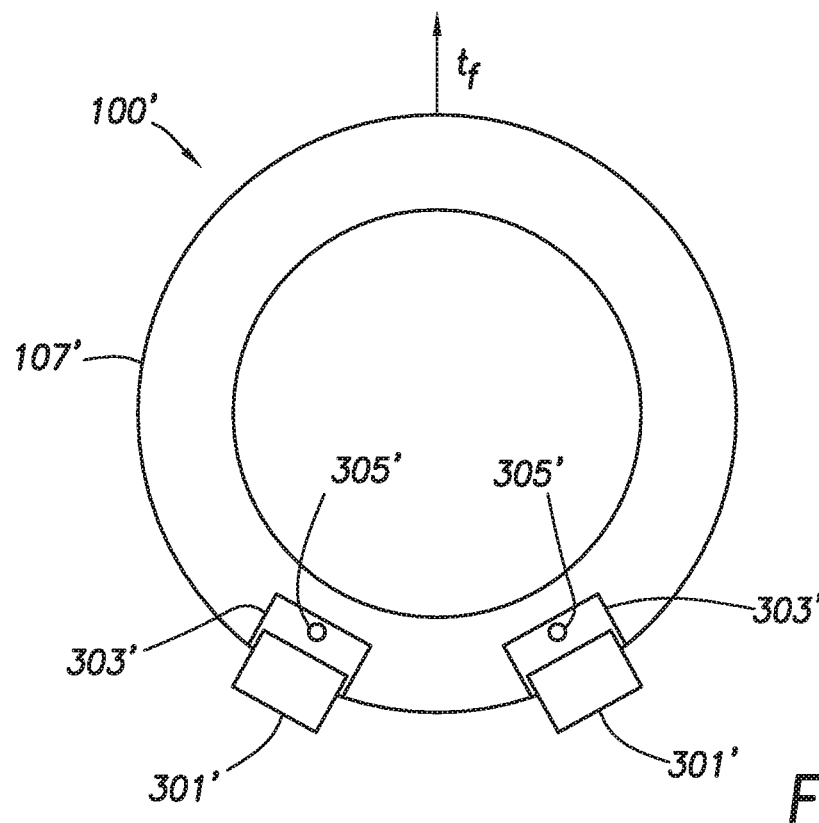
FIG. 25 is a schematic view of a bearing assembly consistent with at least one embodiment of the present disclosure.

In some embodiments, bearing assembly 100' may include a single control piston 301. In some embodiments, bearing assembly 100' may include multiple control pistons 301. In some such embodiments, control pistons 301 may be arranged axially along bearing assembly 100' aligned substantially opposite the toolface (tf) of bearing assembly 100' as depicted in FIG. 24. In some embodiments, control pistons 301' and control piston cylinders 303' may be arranged radially about bearing assembly 100' such that when extended, the net force of control pistons 301' is exerted on the surrounding wellbore in a direction substantially opposite the toolface (tf) of bearing assembly 100' as depicted in FIG. 25. In some such embodiments, multiple control ports 305' may be utilized.

In operation, while bearing assembly 100' is operating in the rotary mode, valve actuator 307 may be biased by rotational forces into the closed position depicted in FIG. 21. In such a position, as discussed above, control valve assembly 300 prevents fluid communication between fluid supply port 319 and control port 305. Control pistons 301 are in the retracted position.

Figure 20:
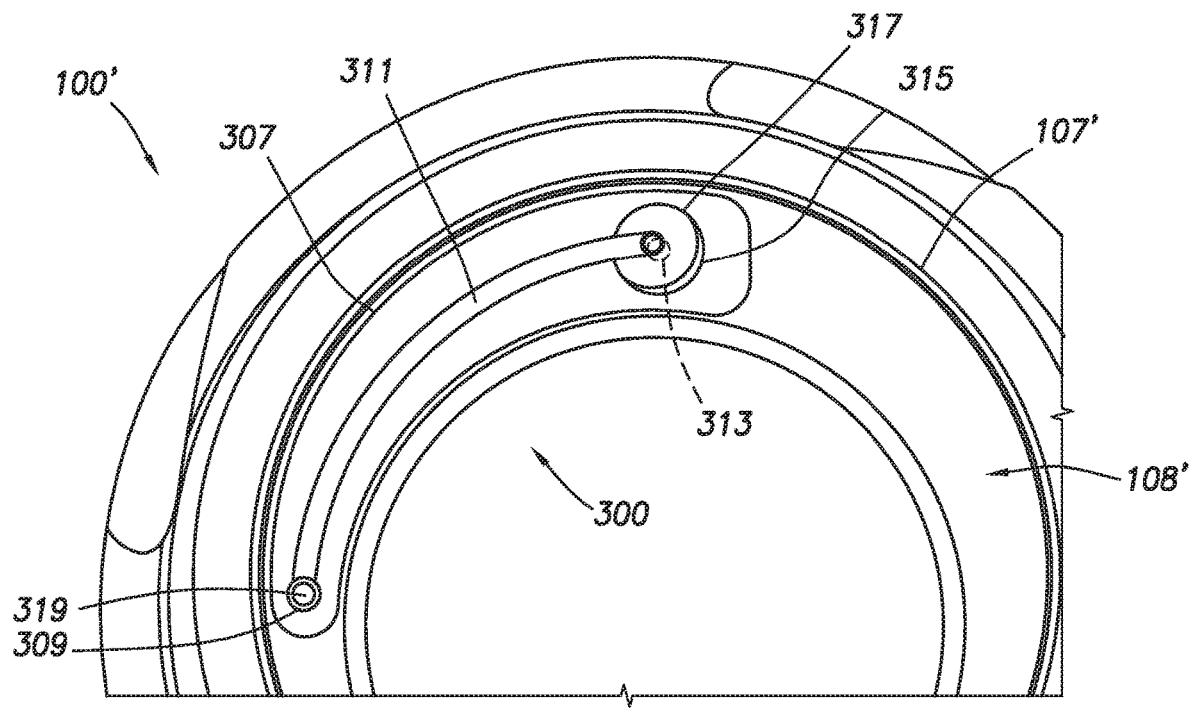
FIG. 20 depicts a partially transparent end view of the control valve of FIG. 17 in a transition position.
Figure 21:
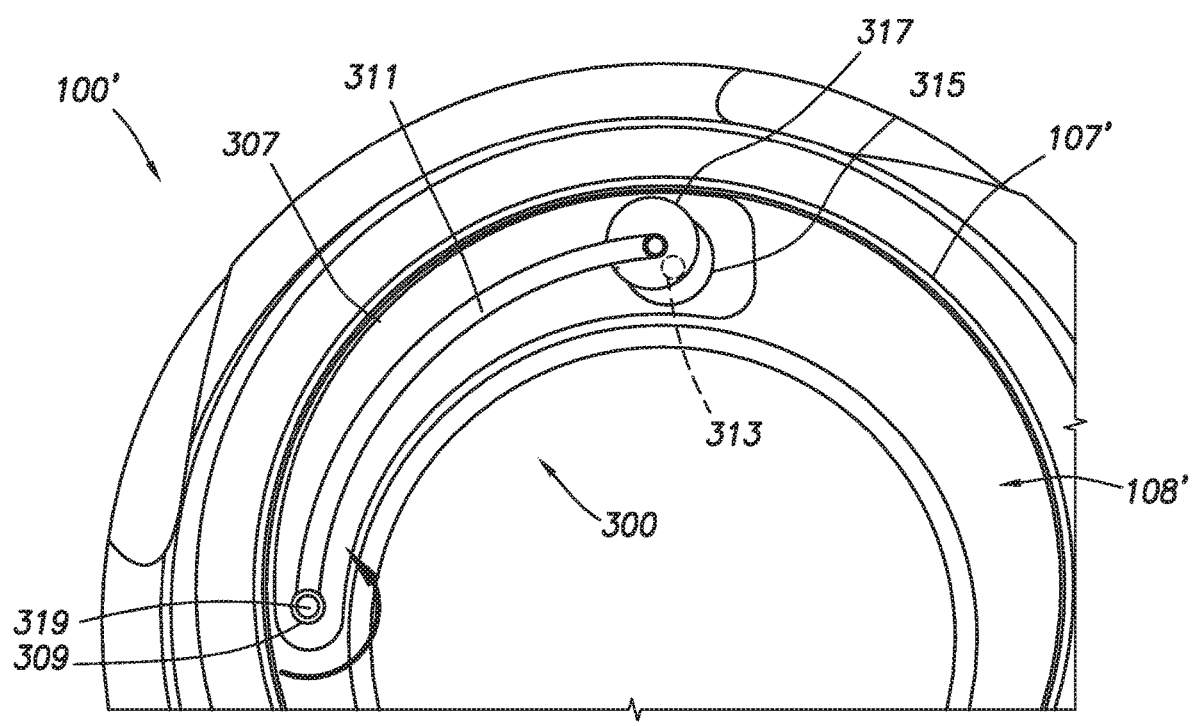
FIG. 21 depicts a partially transparent end view of the control valve of FIG. 17 in a closed position.

As bearing assembly 100' slows to, for example, operate in the sliding mode, the rotational forces on valve actuator 307 reduce, allowing valve actuator 307 to pivot inward through the intermediate position of FIG. 20 to the open position of FIG. 19. In such a position, control valve assembly 300 allows fluid communication between fluid supply port 319 and control port 305. Fluid is therefore able to flow to control piston cylinders 303 and exert fluid pressure on control pistons 301. Control pistons 301 extend by the fluid pressure into contact with the surrounding wellbore. In such a position, control pistons 301 may, for example and without limitation, exert a stabilizing force between bearing assembly 100' and the wellbore. The stabilizing force may, for example and without limitation, reduce rotation of bearing assembly 100' while in the sliding mode, maintain toolface angle relative to the wellbore, or increase lateral pressure between the drill bit and the wellbore to increase build angle in directional drilling operations.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A bearing assembly for a downhole tool comprising:
an upper bearing housing, the upper bearing housing including an upper bearing housing outer surface, the upper bearing housing outer surface being generally cylindrical along a bearing housing longitudinal axis, the upper bearing housing including an upper bearing housing bore formed therein defining an upper bearing housing inner surface, the upper bearing housing bore being generally cylindrical and formed along a bore longitudinal axis, the bore longitudinal axis being formed at an angle to the bearing housing longitudinal axis;

a lower bearing housing, the lower bearing housing mechanically coupled to the upper bearing housing, the lower bearing housing including a lower bearing housing bore formed along the bore longitudinal axis defining a lower bearing housing inner surface; and a driveshaft, the driveshaft positioned within and concentric with the upper bearing housing bore and the lower bearing housing bore, such that it extends along the bore longitudinal axis.

2. The bearing assembly of claim 1, further comprising one or more bearings positioned between the driveshaft and one or more of the upper bearing housing inner surface and the lower bearing housing inner surface.

3. The bearing assembly of claim 2, wherein the one or more bearings comprise one or more of a thrust bearing and a radial bearing.

4. The bearing assembly of claim 2, wherein the one or more bearings are positioned within an annular space defined between the driveshaft and one or both of the upper bearing housing inner surface and lower bearing housing inner surfaces.

5. The bearing assembly of claim 4, wherein the annular space is at least partially filled with oil.

6. The bearing assembly of claim 4, further comprising a piston positioned in the annular space, the piston being annular in shape, the piston sealing between the driveshaft and the upper bearing housing inner surface, the piston adapted to slidingly traverse longitudinally.

7. The bearing assembly of claim 6, wherein the piston separates the annular space into an oil filled portion and a drilling fluid filled portion.

8. A bottomhole assembly comprising:
a bearing assembly including:
an upper bearing housing, the upper bearing housing including an upper bearing housing outer surface, the upper bearing housing outer surface being generally cylindrical along a bearing housing longitudinal axis, the upper bearing housing including an upper bearing housing bore formed therein defining an upper bearing housing inner surface, the upper bearing housing bore being generally cylindrical and formed along a bore longitudinal axis, the bore longitudinal axis being formed at an angle to the bearing housing longitudinal axis;
a lower bearing housing, the lower bearing housing mechanically coupled to the upper bearing housing, the lower bearing housing including a lower bearing housing bore formed along the bore longitudinal axis defining a lower bearing housing inner surface; and
a driveshaft, the driveshaft positioned within and concentric with the upper bearing housing bore and the lower bearing housing bore, such that it extends along the bore longitudinal axis;
a transmission housing, the transmission housing mechanically coupled to the upper bearing housing; and
a transmission shaft positioned within the transmission housing, the transmission shaft mechanically coupled to the driveshaft.

9. The bottomhole assembly of claim 8, wherein the transmission housing is mechanically coupled to the upper bearing housing at an angle.

10. The bottomhole assembly of claim 8, further comprising one or more bearings positioned between the driveshaft and one or more of the upper bearing housing inner surface and the lower bearing housing inner surface.

11. The bottomhole assembly of claim 10, wherein the one or more bearings comprise one or more of a thrust bearing and a radial bearing.

12. The bottomhole assembly of claim 10, wherein the one or more bearings are positioned within an annular space defined between the driveshaft and one or both of the upper bearing housing inner surface and lower bearing housing inner surfaces.

13. The bottomhole assembly of claim 12, wherein the annular space is at least partially filled with oil.

14. The bottomhole assembly of claim 12, further comprising a piston positioned in the annular space, the piston being annular in shape, the piston sealing between the driveshaft and the upper bearing housing inner surface, the piston adapted to slidingly traverse longitudinally.

15. The bottomhole assembly of claim 14, wherein the piston separates the annular space into an oil filled portion and a drilling fluid filled portion.

16. The bottomhole assembly of claim 8, further comprising:
a control piston, the control piston positioned within a control piston cylinder, the control piston cylinder formed in the outer surface of the upper bearing housing;
a control port, the control port formed in the upper bearing housing; the control port in fluid communication with the control piston cylinder;
a control valve assembly, the control valve assembly positioned at the upper end of the upper bearing housing, the control valve assembly including:
a fluid supply port, the fluid supply port formed in the upper bearing housing, the fluid supply port in fluid communication with the interior of the upper bearing housing;
a valve actuator, the valve actuator pivotably coupled to the upper end of the upper bearing housing by a pivot pin, the pivot pin being tubular, the valve actuator including a valve port formed therein, the valve port in fluid communication with the fluid supply port through the pivot pin; and
an output port, the output port formed in the upper bearing housing, the output port in fluid communication with the control port, the output port in fluid communication with the valve port when the valve actuator is in an open position and out of fluid communication with the valve port when the valve actuator is in a closed position.

17. The bottomhole assembly of claim 16, wherein the output port is in fluid communication with the control port through an annular flowpath, the annular flowpath defined between the upper bearing housing and a pressure ring.

18. The bottomhole assembly of claim 16, wherein the upper bearing housing and valve actuator each further comprises a valve insert, each valve insert including an insert port, the valve inserts positioned such that the insert ports are in alignment when the valve actuator is in the open position and are out of alignment when the valve actuator is in the closed position.

19. The bottomhole assembly of claim 18, wherein the insert ports are round.

20. The bottomhole assembly of claim 18, wherein the insert ports are ovoid or oblong.

21. The bottomhole assembly of claim 16, wherein the control piston extends in a direction generally radially aligned with the direction in which the bore longitudinal axis is formed at an angle to the bearing housing longitudinal axis.

22. The bottomhole assembly of claim 16, further comprising a second control piston, wherein the first and second control pistons are arranged radially about the bearing assembly.

23. The bottomhole assembly of claim 16, wherein the valve actuator is configured to pivot from the open position to the closed position in response to rotational forces as the bearing assembly is rotated.

24. The bottomhole assembly of claim 16, wherein the control piston further comprises an exhaust port.

25. The bottomhole assembly of claim 16, further comprising a piston retraction mechanism.

26. The bottomhole assembly of claim 16, further comprising an actuator return mechanism.

\* \* \* \* \*